United States Patent
Cho

(10) Patent No.: US 10,908,787 B2
(45) Date of Patent: Feb. 2, 2021

(54) METHOD FOR SHARING CONTENT INFORMATION AND ELECTRONIC DEVICE THEREOF

(71) Applicant: Samsung Electronics Co., Ltd., Gyeonggi-do (KR)

(72) Inventor: Bum-Seung Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 15/189,404

(22) Filed: Jun. 22, 2016

(65) Prior Publication Data

US 2017/0017366 A1 Jan. 19, 2017

(30) Foreign Application Priority Data

Jul. 16, 2015 (KR) ........................ 10-2015-0101066

(51) Int. Cl.
| | | |
|---|---|---|
| *G06F 3/0484* | (2013.01) | |
| *H04N 21/2743* | (2011.01) | |
| *H04N 1/00* | (2006.01) | |
| *H04N 21/4788* | (2011.01) | |
| *G06F 40/14* | (2020.01) | |
| *G06T 11/00* | (2006.01) | |
| *H04L 29/08* | (2006.01) | |

(52) U.S. Cl.
CPC ............ *G06F 3/0484* (2013.01); *G06F 40/14* (2020.01); *G06T 11/00* (2013.01); *H04L 67/10* (2013.01); *H04N 1/00244* (2013.01); *H04N 1/00307* (2013.01); *H04N 21/2743* (2013.01); *H04N 21/4788* (2013.01); *H04N 2201/0039* (2013.01); *H04N 2201/3253* (2013.01)

(58) Field of Classification Search
CPC combination set(s) only.
See application file for complete search history.

(56) References Cited

U.S. PATENT DOCUMENTS

2006/0041589 A1* 2/2006 Helfman ............. G06F 17/3089
2006/0232836 A1* 10/2006 Yamada ................. G06F 16/50
358/527

(Continued)

FOREIGN PATENT DOCUMENTS

| EP | 2 874 419 A1 | 5/2015 |
|---|---|---|
| KR | 10-2015-0045721 A | 4/2015 |
| WO | 2004/074778 A1 | 9/2004 |

OTHER PUBLICATIONS

International Search Report dated Oct. 11, 2016.
(Continued)

*Primary Examiner* — James T Tsai
(74) *Attorney, Agent, or Firm* — Cha & Reiter, LLC.

(57) ABSTRACT

The present disclosure relates to a method and apparatus for an electronic device to share content information. The electronic device includes: a display; a processor that is electrically connected to the display; and a memory that is electrically connected to the processor. Upon the processor executing instructions stored in the memory, the processor is configured to perform: displaying a content in the display; detecting at least one shared area from the content; and generating a single image based on information associated with the at least one shared area.

18 Claims, 26 Drawing Sheets

(56) References Cited

U.S. PATENT DOCUMENTS

| | | | | |
|---|---|---|---|---|
| 2007/0106952 A1* | 5/2007 | Matas | ................ | G06F 16/9577 715/764 |
| 2008/0045138 A1 | 2/2008 | Milic-Frayling et al. | | |
| 2008/0201452 A1* | 8/2008 | Athas | ................ | H04L 67/2828 709/219 |
| 2008/0307301 A1* | 12/2008 | Decker | ............... | G06F 16/9577 715/241 |
| 2009/0144392 A1* | 6/2009 | Wang | ................ | G06Q 10/10 709/217 |
| 2010/0169906 A1 | 7/2010 | Takahashi | | |
| 2010/0210293 A1* | 8/2010 | Lim | ................ | H04M 1/274516 455/466 |
| 2011/0161880 A1* | 6/2011 | Abbott | ................ | G06F 3/04842 715/823 |
| 2012/0010995 A1* | 1/2012 | Skirpa | ................ | G06F 3/0481 705/14.49 |
| 2012/0054597 A1* | 3/2012 | Yamada | ................ | G06T 11/60 715/234 |
| 2012/0150661 A1* | 6/2012 | DeStein | ............. | G06Q 30/0276 705/14.72 |
| 2012/0173963 A1* | 7/2012 | Hoke | ................ | G06F 16/9577 715/234 |
| 2012/0173988 A1 | 7/2012 | Tran et al. | | |
| 2013/0205219 A1* | 8/2013 | Moha | ................ | H04L 67/00 715/748 |
| 2013/0227455 A1* | 8/2013 | Lee | ................ | G06F 3/04883 715/769 |
| 2013/0290863 A1* | 10/2013 | Chen | ................ | G06F 3/0481 715/747 |
| 2014/0101565 A1 | 4/2014 | Mahieu et al. | | |
| 2014/0184821 A1 | 7/2014 | Taneichi et al. | | |
| 2014/0208201 A1* | 7/2014 | Bustelo | ................ | G06F 40/131 715/235 |
| 2015/0009152 A1 | 1/2015 | Tang et al. | | |
| 2015/0088817 A1 | 3/2015 | Dwan et al. | | |
| 2015/0112997 A1 | 4/2015 | Kim et al. | | |
| 2015/0170200 A1 | 6/2015 | Rajkumar et al. | | |
| 2016/0274771 A1* | 9/2016 | Seong | ................ | G06F 3/0482 |
| 2016/0283083 A1* | 9/2016 | Fu | ............................ | G06F 9/451 |
| 2017/0003862 A1* | 1/2017 | Mital | ................ | G06F 3/04847 |
| 2017/0371844 A1* | 12/2017 | Yao | ............................ | G06F 8/38 |

OTHER PUBLICATIONS

European Search Report dated Nov. 22, 2016.
European Search Report dated Mar. 14, 2018.
European Search Report dated Mar. 26, 2019.
European Search Report dated Nov. 26, 2018.

* cited by examiner

METHOD FOR SHARING CONTENT INFORMATION AND ELECTRONIC DEVICE THEREOF

CLAIM OF PRIORITY

This application claims the benefit of priority under 35 U.S.C. § 119(a) from Korean Application Serial No. 10-2015-0101066, which was filed in the Korean Intellectual Property Office on Jul. 16, 2015, the entire content of which is hereby incorporated by reference.

BACKGROUND

1. Field of the Disclosure

The present disclosure relates to a method and apparatus for sharing captured content information in an electronic device.

2. Description of the Related Art

With the development of information and communication technologies and semiconductor technologies, various types of electronic devices have developed into multimedia devices that provide various multimedia services. For example, portable electronic devices may provide diverse multimedia services, such as broadcast services, wireless Internet services, camera services, and music playback services.

An electronic device may share, with at least an external device, content information that is output through a browser, a Social Networking Service (SNS), or the like. For example, the electronic device may transmit, to the external device, link information (e.g., Uniform resource Locator (URL)) associated with a content to be shared with the external device. Also, the electronic device may capture the entire content output in the display of the electronic device, and may transmit the same to the external device. Here, the external device may include at least one of a partner electronic device and a server.

An electronic device may share with an external device the whole of the information associated with a content by using link information of the content or a captured image. A drawback to the conventional way of sharing content is that, for example, in this instance, the electronic device may share with the external device, not only a part of the information associated with the content that needs to be shared, but also shares even unnecessary information in addition to the part of the information associated with the content that needs to be shared.

For example, when the electronic device transmits a captured image associated with the content to an external device, unnecessary information, in addition to the information to be shared, may be captured at once from the content and may be transmitted to the external device. Accordingly, a user of the electronic device desires a method of sharing the part of the information of the content with the external device.

Another drawback to conventional operation is that the electronic device shares content information using link information of the content, the intention of the user to share the content may be distorted. For example, the external device may obtain corresponding content information through the link information provided from the electronic device. The external device may display the content information based on the characteristic of the display of the external device. When the characteristics of the displays of the electronic device and the external device are different from each other, the content information displayed in the external device may be displayed in a manner that is different from the intention of the user of the electronic device. Here, the characteristic of the display may include size, resolution, and the like associated with the display.

SUMMARY

According to various embodiments of the present disclosure, there is provided a method and apparatus for sharing at least partial information associated with a content in an electronic device.

According to various embodiments of the present disclosure, there is provided an electronic device, the device including: a display; a processor that is electrically connected to the display; and a memory that is electrically connected to the processor. When the processor executes instructions the memory stores instructions that configure the processor to perform: displaying a content in the display; detecting at least one shared area from the content; and generating a single image based on information associated with the at least one shared area.

According to various embodiments of the present disclosure, there is provided a method of operating an electronic device, the method including: displaying a content in a display of the electronic device; detecting at least one shared area from the content; and generating a single image based on information associated with the at least one shared area.

BRIEF DESCRIPTION OF THE DRAWINGS

The above and other aspects, features, and advantages of the present disclosure will become more apparent to a person of ordinary skill in the art from the following detailed description taken in conjunction with the accompanying drawings, in which.

DETAILED DESCRIPTION

Figure 1:
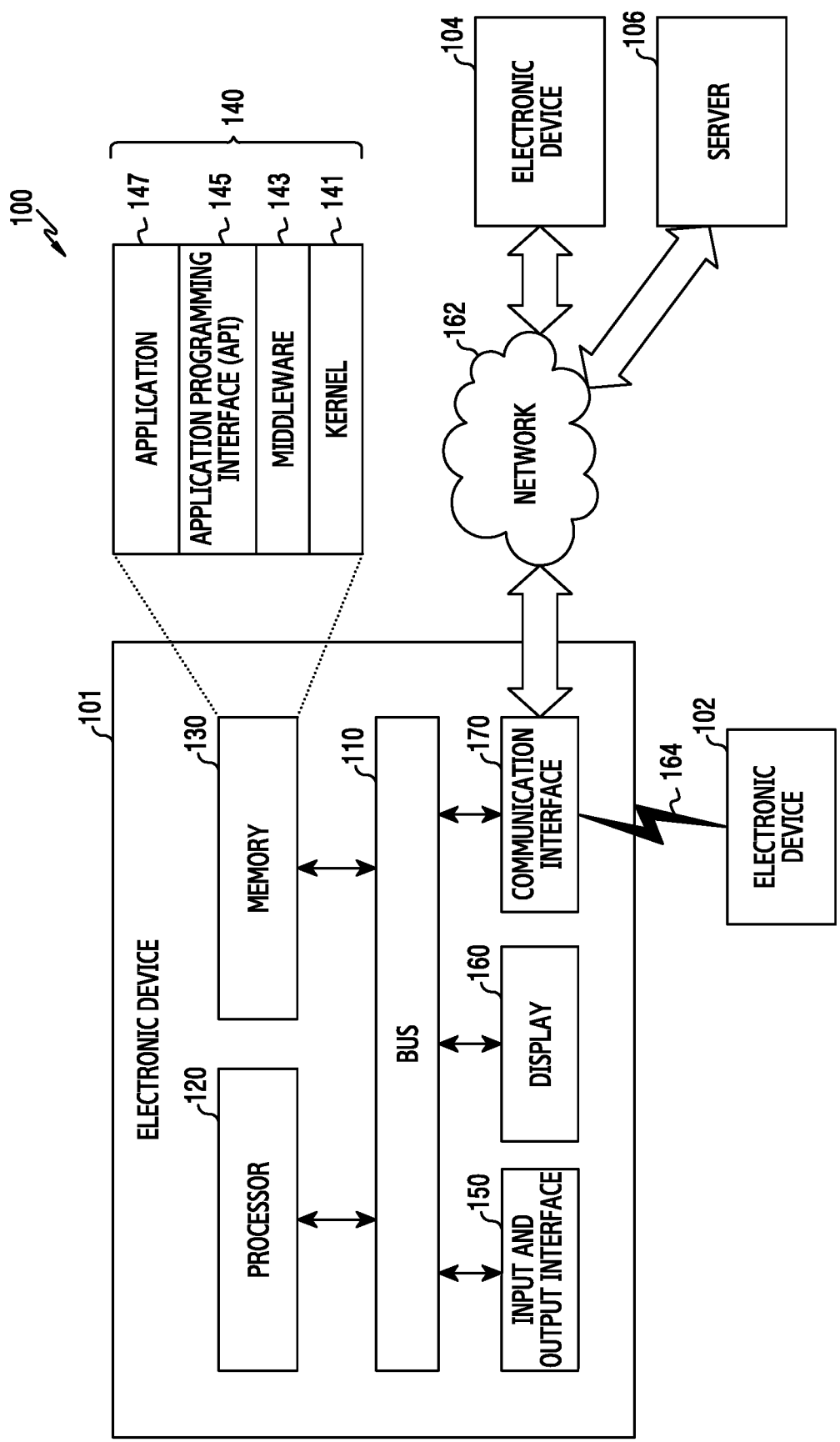
FIG. 1 illustrates an electronic device in a network environment according to various embodiments of the present disclosure.

Hereinafter, various embodiments of the present disclosure will now be described with reference to the accompanying drawings. In the following description, specific details such as a detailed configuration and components are merely provided to assist a person of ordinary skill in the art with an overall understanding of these embodiments of the present disclosure. Therefore, it should be apparent to those skilled in the art that various changes and modifications of the embodiments described herein may be made without departing from the scope and spirit of the present disclosure as expressed in the appended claims. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" are used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device both indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. For example, "a processor configured to (set to) perform A, B, and C" may be a dedicated processor, e.g., an embedded processor comprising hardware circuitry configured for performing a corresponding operation, or a generic-purpose processor, e.g., a Central Processing Unit (CPU) or an application processor (AP), configured for performing a corresponding operation by executing one or more software programs stored in a memory device.

The terms as used herein are used merely to describe certain embodiments of the disclosure and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Hereinafter, in various embodiments of the present disclosure, a content may be generated based on configuration information that is in the form of a markup language, such as a Chemical Markup Language (CML), Hypertext Markup Language (HTML), Extensible Markup Language (XML), or the like.

Referring now to FIG. 1, an electronic device 101 in a network environment 100, according to various embodiments of the present disclosure, is illustrated. The electronic device 101 may include a bus 110, at least one processor 120 (e.g., including processing circuitry), a memory 130, an input/output interface 150 (e.g., including input/output circuitry), a display 160 (e.g., including a display panel and display circuitry), and a communication interface 170 (e.g., including communication circuitry). In some embodiments, the electronic device 101 may omit at least one of the above components or may further include other components.

The bus 110 may include, for example, a circuit that interconnects the components 120 to 170 and delivers communication (e.g., a control message and/or data) between the components 120 to 170.

The at least one processor 120, which comprises hardware circuitry configured for operation, may include one or more of a Central Processing Unit (CPU), an Application Processor (AP), and a Communication Processor (CP). For example, the processor 120 may carry out operations or data processing relating to control and/or communication of at least one other components of the electronic device 101.

According to an embodiment of the present disclosure, the processor 120 may execute a control to extract at least partial information of a content, and to share the extracted information with an external device. For example, the processor 120 may determine at least one shared area information, based on share-tag information of the content. The processor 120 may generate a single captured image based on partial information of a content, which is included in at least one shared area. The processor 120 may transmit the captured image to the external device through the communication interface 170. Here, the external device may include a first external electronic device 102, a second external electronic device 104, a server 106, or the like.

According to an embodiment of the present disclosure, the processor 120 may generate a content including shared area information. For example, the processor 120 may generate a content in the form of a card, of which a share-tag includes at least one shared area of information. Here, in the case of the content provided in the form of a card, each area forming the content may be formed in a square shape, such as a card, but are not limited to such shape. Hereinafter, an area in the form of a card, which forms the content, may be referred to as a card area.

The memory 130 may include a volatile memory and/or a non-volatile memory. The memory 130 may store, for example, instructions or data (e.g., a reference distance) related to at least one other component. According to an embodiment, the memory 130 may store software and/or a program 140. For example, the program may include a kernel 141, a middleware 143, an Application Programming Interface API 145, an application program (or application) 147, or the like. At least some of the kernel 141, the middleware 143, and the API 145 may be referred to as an Operating System (OS).

The input/output interface 150 comprises hardware configured for operation. For example, the input/output interface may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device. For example, the input/output interface 150 may receive a touch, gesture, proximity, or hovering input by using an electronic pen or the user's body part, and sensing, for example, a change in capacitance, resistance, etc.

The display 160 may display, for example, various types of contents (for example, text, images, videos, icons, or symbols) for the user.

The communication interface 170 may set communication between, for example, the electronic device 101 and an external device (for example, a first external electronic device 102, a second external electronic device 104, or a server 106). For example, the communication interface 170 may be coupled to a network 162 through wireless or wired communication to communicate with the external device (for example, the second external electronic device 104 or the server 106). For example, the communication interface 170 may communicate with the external device (for example, the first external electronic device 102) through short range communication 164. Herein, the communication interface 170 includes hardware, such as, for example, a transmitter, receiver, transceiver, codec, one or more antennas, etc.

The network 162 may include at least one of communication networks, such as a computer network (e.g., a LAN or a WAN), the Internet, and a telephone network.

Figure 2:
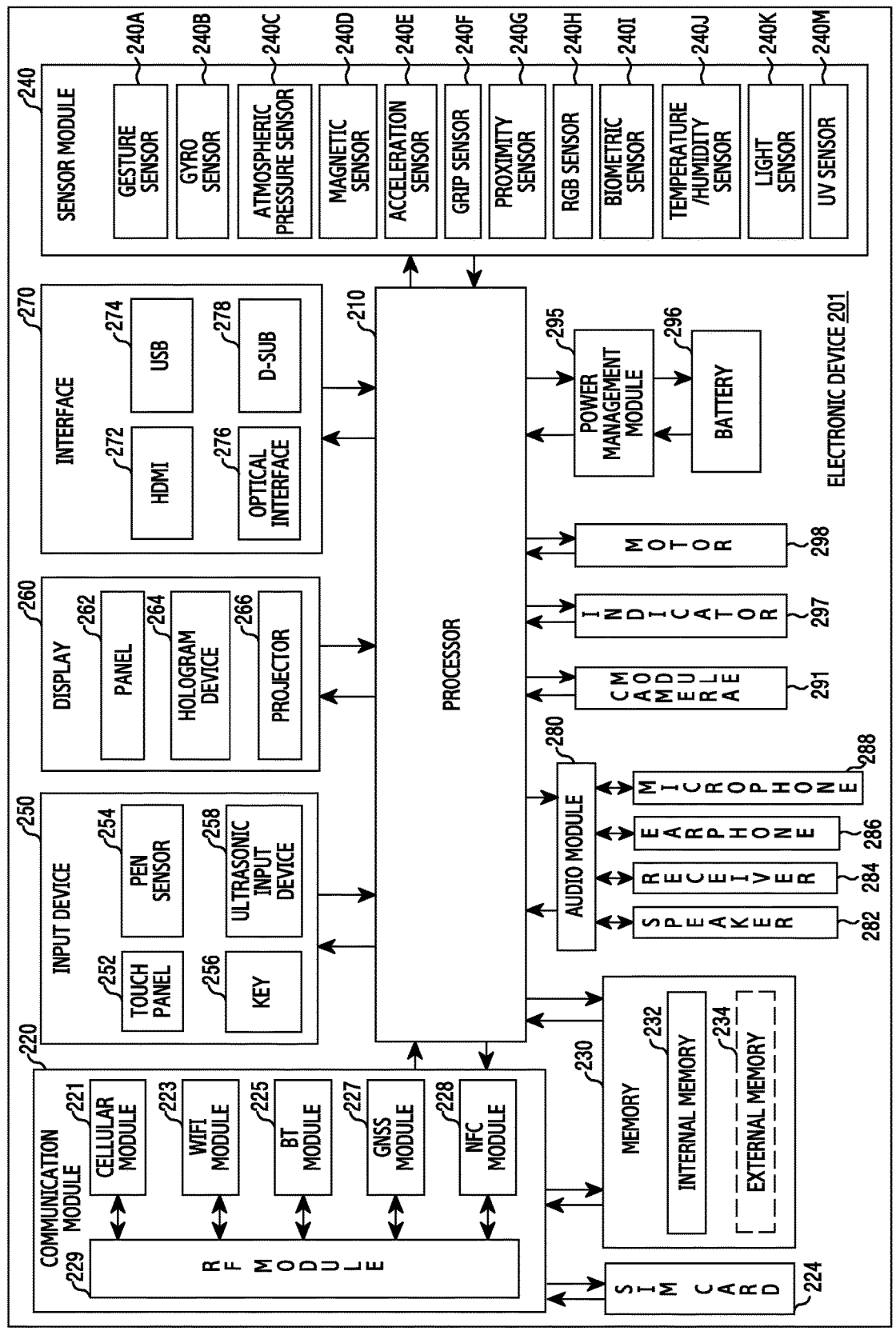
FIG. 2 is a block diagram of an electronic device according to various embodiments of the present disclosure.

FIG. 2 is a block diagram of an electronic device 201 according to various embodiments. The electronic device 201 may include, for example, all or a part of the electronic device 101 illustrated in FIG. 1. The electronic device 201 may include at least one processor (for example, application processor (AP)) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The at least one processor 210 includes hardware circuitry configured for operation, such as an integrated circuit, and may, for example, control a plurality of hardware or software elements connected thereto and perform a variety of data processing and calculations by driving an operating system or application programs. The at least one processor 210 may be implemented as, for example, a system on chip (SoC). According to an embodiment, the at least one processor 210 may further include a graphic processing unit (GPU) and/or an image signal processor. The at least one processor 210 may include at least one or more of the elements (e.g., a cellular module 221) illustrated in FIG. 2. The processor 210 may load commands or data, received from at least one other element (e.g., a non-volatile memory), in a volatile memory to process the loaded commands or data, and may store various types of data in the non-volatile memory. The at least one processor 210 may load, into a volatile memory, machine executable code, e.g. instructions, or data received from at least one (for example, a non-volatile memory) of the other elements and executes the loaded instructions or data, and may store various data in a non-volatile memory.

According to an embodiment of the present disclosure, the at least one processor 210 may execute a control to share, with at least one external device, a captured image including at least partial information of a content.

The communication module 220 may have a configuration including the described hardware that is equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a Radio Frequency (RF) module 229.

The cellular module 221 may provide, for example, application, a voice call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GNSS module 227, or the NFC module 228 may include, for example, a processor comprising circuitry for processing data transmitted/received through the corresponding module. According to an embodiment, at least some (e.g., two or more) of the cellular module 221, the Wi-Fi module 223, the BT module 225, the GNSS module 227, and the NFC module 228 may be included in a single integrated chip (IC) or IC package.

The RF module 229 may, for example, transmit/receive a communication signal (e.g., an RF signal). The RF module 229 may include, for example, a transmitter, receiver, or a transceiver, a power amp module (PAM), a frequency filter, a low noise amplifier (LNA), or at least one antenna, or an antenna array. According to another embodiment, at least one of the cellular module 221, the Wi-Fi module 223, the BT module 225, the GNSS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, thumbnail, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further include at least one processor that is configured as a part of the AP 210 or a separate element from the AP 210 in order to control the sensor module 240, thereby controlling the sensor module 240 while the AP 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278, just to name some non-limiting possible examples. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 150 illustrated in FIG. 1. The audio module 280 may, for example, process sound information that is input or output through the speaker 282, the receiver 284, the earphones 286, the microphone 288, or the like.

The camera module 291 may be, for example, a device that can take a still image or a moving image, and according to an embodiment, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an embodiment, the power management module 295 may include a Power Management Integrated Circuit (PMIC), a charger IC, or a battery or fuel gauge. The battery 396 may include, for example, a rechargeable battery or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 3:
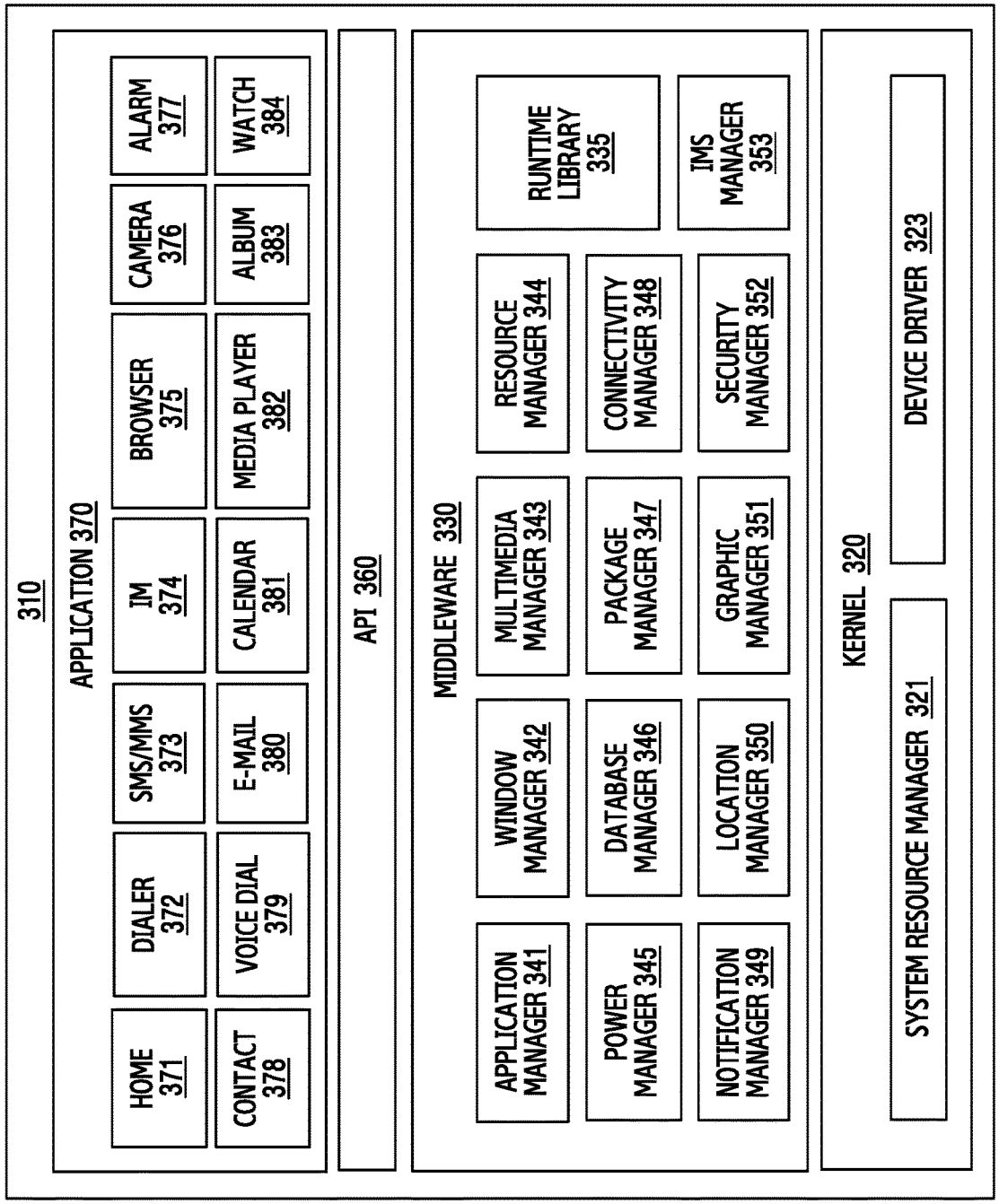
FIG. 3 is a block diagram of a program module according to various embodiments of the present disclosure.

FIG. 3 is a block diagram of a program module 310 according to various embodiments. According to an embodiment, the program module 310 (e.g., the program 140) may include an operating system (OS) that controls resources relating to an electronic device (e.g., the electronic device 101 or 201) and/or various applications (e.g., the application 147) executed in the operating system. The operating system may be, for example, Android, iOS™, Windows™, Symbian™, Tizen™, Bala™, or the like.

The program module 310 may include a kernel 320, middleware 330, an application programming interface (API) 360, and/or applications 370. At least some of the program module 310 may be preloaded in the electronic device, or may be downloaded from an external electronic device (e.g., the electronic device (102, 104), the server 106).

The kernel 320 (for example, the kernel 141) may include, for example, a system resource manager 321 and/or a device driver 323. The system resource manager 321 may perform the control, allocation, retrieval, or the like of system resources.

With continued reference to FIG. 3, the middleware 330 may provide, for example, a function commonly required by the applications 370, or may provide various functions to the applications 370 through the API 360 so that the applications 370 can efficiently use limited system resources within the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and an IMS manager 353.

The runtime library 335 may include a library module, which a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) that is appropriate for the corresponding format. The resource manager 344 may manage resources, such as a source code, a memory, a storage space, and the like of at least one of the applications 370.

The power manager 345 may operate together with, for example, a Basic Input/Output System (BIOS) or the like, so as to manage a battery or power, and may provide power information required for the operation of the electronic device. According to an embodiment of the present disclosure, the power manager 345 may control charging and discharging a battery through at least one of a wired scheme or a wireless scheme.

The database manager 346 may generate, search for, and/or change a database to be used by at least one of the applications 370. The package manager 347 may manage the installation or updating of an application distributed in the form of a package file.

The connectivity manager 348 may manage a wireless connection (for example, Wi-Fi, Bluetooth, or the like). The notification manager 349 may display or notify of an event (such as an arrival message, an appointment, a proximity notification, and the like) in such a manner not to disturb a user. The location manager 350 may manage location information of the electronic device. The graphic manager 351 may manage a graphic effect, which is to be provided to a user, or a user interface related to the graphic effect. The security manager 352 may provide various security functions required for system security, user authentication, and the like. The IMS manager 353 may provide a multimedia service, such as an application, audio, video, data, or the like, based on an Internet Protocol (IP).

According to an embodiment of the present disclosure, when the electronic device (for example, the electronic device 101) includes a telephone call function, the middleware 330 may further include a telephony manager for managing an application or a video call function of the electronic device.

The middleware 330 may include a middleware module that forms a combination of various functions of the above-described components. The middleware 330 may provide a module specialized for each type of OS in order to provide a differentiated function. Also, the middleware 330 may dynamically delete some of the existing components, or may add new components.

The API 360 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application programs 147) may include, for example, one or more applications which can provide functions such as a home 371, a dialer 372, a SMS/MMS 373, an Instant Message (IM) 374, a browser 375, a camera 376, an alarm 377, contacts 378, a voice dialer 379, an email 380, a calendar 381, a media player 382, an album 383, a clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device (for example, an SMS/MMS application, an e-mail application, a health care application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some elements) or a function of adjusting luminance (or a resolution) of the display), applications operating in the external electronic device, or services provided by the external electronic device (for example, a call service and a message service).

According to an embodiment of the disclosure, the applications 370 may include a preloaded application or a third party application which can be downloaded from the server. Names of the elements of the program module 310 according to the above-illustrated embodiments may change depending on the type of OS.

According to various embodiments of the disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process, for performing one or more functions.

Figure 4:
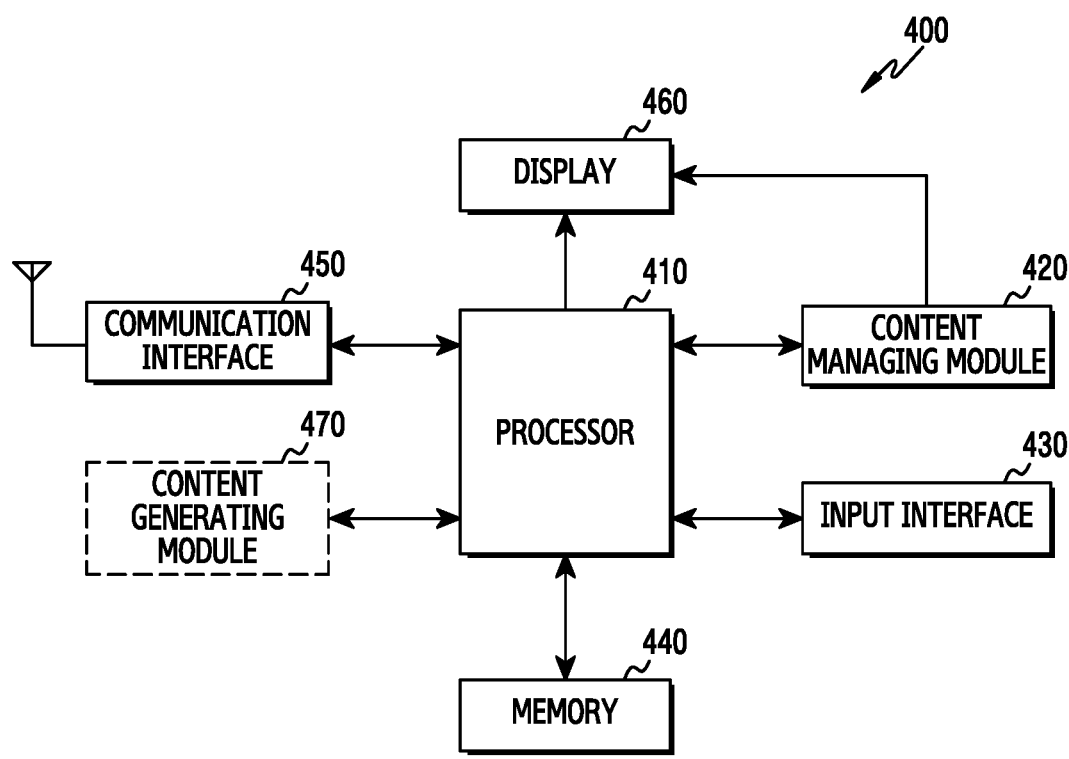
FIG. 4 is a block diagram of an electronic device for sharing a content according to various embodiments of the present disclosure.

FIG. 4 is a block diagram of an electronic device for sharing a content according to various embodiments of the present disclosure. Hereinafter, an electronic device 400 may include some or all of the electronic device 101 of FIG. 1 or the electronic device 201 of FIG. 2.

Referring now to FIG. 4, the electronic device 400 may include at least one processor 410 (e.g., including processing circuitry), a content managing module 420 (e.g., including content managing circuitry), an input interface 430 (e.g., including input circuitry), a memory 440, a communication interface 450 (e.g., including communication circuitry), a display 460 (e.g., including display circuitry), and a content generating module 470 (e.g., including content generating circuitry). For example, when a content generating function is supported, the electronic device 400 may include the content generating module 470. For example, when the content generating function is not supported, the electronic device 400 may omit the content generating module 470.

The electronic device 400 may include at least one processor 410 (e.g., the processor 120 or 210). For example, the processor 410 may include one or more of a Central Processing Unit (CPU), an Application Processor (AP), and a Communication Processor (CP).

According to an embodiment of the present disclosure, the processor 410 may be configured to control the content managing module 420 to share at least a part of a content with an external device. For example, when a sharing event is detected, the processor 410 may output sharing event detection information to the content managing module 420. For example, the processor 410 may control the communication interface 450 to transmit, to at least one external device, a captured image generated by the content managing module 420. For example, the processor 410 may control the communication interface 450 to transmit, to at least one external device, text information extracted by the content managing module 420.

According to an embodiment of the present disclosure, the content managing module 420 may configure a content to be displayed in the display 460, based on the configuration data of the content. For example, the content managing module 420 may parse components of the content (e.g., a CML document) and may render the content to be displayed in the display 460. For example, the content managing module 420 may generate an image of the content to be displayed in the display 460, through rendering. In this instance, the content managing module 420 may generate an image of a corresponding area for each area that forms the content.

According to an embodiment of the present disclosure, the content managing module 420 may generate a captured image that includes at least partial information of a content. For example, when sharing event detection information is received from the processor 410, the content managing module 420 may determine at least one shared area set in a share-tag (e.g., a "share" tag) from the configuration data of the content. The content managing module 420 may generate a single captured image based on partial information of the content included in at least one shared area. For example, the content managing module 420 may extract a rendered image corresponding to at least one shared area from the images associated with areas forming the content, which are generated through rendering, and may generate a single captured image. For example, the content managing module 420 may extract tag information associated with at least one shared area, and may generate the configuration data of a captured image. The content managing module 420 may parse the configuration data of a captured image, and may render the captured image. Here, the share-tag of the content may include shared area information that is determined when the content is generated, or that is added as a response to the occurrence of a shared area setting event.

According to an embodiment of the present disclosure, the content managing module 420 may extract text information included in a content. For example, when sharing event detection information is received from the processor 410, the content managing module 420 may extract the text information included in the configuration data of the content. For example, when sharing event detection information is received from the processor 410, the content managing module 420 may extract text information included in a shared area from the configuration data of the content.

The input interface 430 may transfer instructions or data input from a user or another external device for controlling the operations of the electronic device 400, to another component (other components) of the electronic device 400. For example, the input interface 430 may include a key pad, a dome switch, a physical button, a touch pad (resistive/capacitive type), jog & shuttle, a sensor, and the like. For example, the input interface 430 may receive an input (a user touch input, a hovering input, or the like) through a touch screen.

The memory 440 may store instructions or data relevant to components forming the electronic device 400. For example, the memory 440 may store configuration data of a content generated through the content generating module 470, or may store configuration data of a content received from an external device.

The communication interface 450 may transmit or receive a signal between the electronic device 400 and an external device (for example, another electronic device or a server). The communication interface 450 may include a cellular module and a non-cellular module. The non-cellular module may enable communication between the electronic device 400 and another electronic device and/or server using a short-range wireless communication scheme. For example, the communication interface 450 may be connected to a network through wireless communication or wired communication, and may communicate with an external device. Herein, the communication module 450 transmits wirelessly, wired, or both.

The display 460 may display various types of contents (e.g., text, images, videos, icons, symbols, or the like) to a user. For example, the display 460 may display content information (e.g., a content image) or a captured image, which is generated by the content managing module 420.

The content generating module 470 may generate the configuration data of a content in the form of a markup language. For example, the content generating module 470 may extract at least partial information of at least one different content, and may generate the configuration data associated with each area forming the content. For example, each area is comprised of an area (portion) of a card that forms the content.

According to an embodiment of the present disclosure, the content generating module 470 may set a shared area of a content. For example, when a shared area of the content is set, the content generating module 470 may insert shared area information into a share-tag of the content.

According to various embodiments of the present disclosure, an electronic device may include a display; a processor that is communicatively coupled to the display; and a memory that is communicatively coupled to the processor. The memory is configured to store instructions that when executed configure the processor to control the display to display a content in the display; detect at least one shared area from the content; and generate a single image based on information associated with the at least one shared area.

According to various embodiments of the present disclosure, the instructions cause the processor to render configuration data of the content that is in the form of a markup language, and control the display to display the content in the display based on the rendered configuration data.

According to various embodiments of the present disclosure, the instructions cause the processor to detect at least one piece of shared area information that is set in a share-tag from the configuration data of the content.

According to various embodiments of the present disclosure, the share-tag includes at least one piece of shared area information that is inserted based on input information.

According to various embodiments of the present disclosure, the instructions cause the processor to detect, from the configuration data of the content, at least one piece of area information to which a property parameter indicating a shared area is inserted.

According to various embodiments of the present disclosure, the instructions when executed by the processor can generate the single image based on at least one rendered image corresponding to the at least one shared area.

According to various embodiments of the present disclosure, the instructions when executed by the processor cause the processor to perform: extracting configuration data associated with the at least one shared area, so as to generate configuration data of the image; and rendering the configuration data of the image so as to generate the single image.

According to various embodiments of the present disclosure, the instructions when executed by the processor cause the processor to perform: selecting an application program for transmitting the single image; and controlling the display to display the single image to an execution screen of the application program.

According to various embodiments of the present disclosure, the instructions enable the processor to generate a content including the at least one shared area information.

According to various embodiments of the present disclosure, the instructions enable the processor to generate a content in the form of a card.

Figure 5:
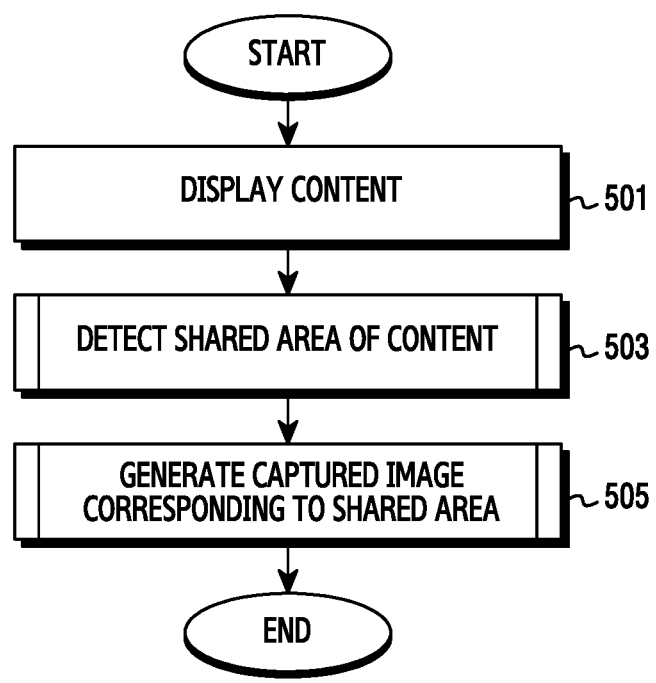
FIG. 5 is a flowchart illustrating an operational example of a process in which an electronic device captures at least partial information of a content according to various embodiments of the present disclosure.
Figure 6:
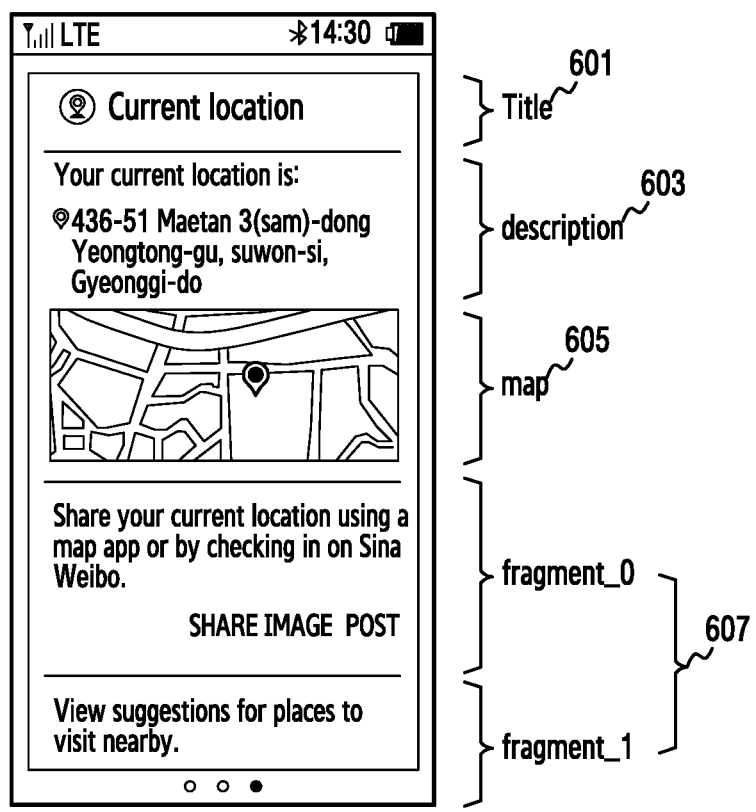
FIG. 6 is a diagram illustrating a configuration of a screen of a content that is displayed in an electronic device according to various embodiments of the present disclosure.

FIG. 5 is a flowchart illustrating an operational example of a process in which an electronic device captures at least partial information of a content according to various embodiments of the present disclosure. Hereinafter, the operations for capturing at least partial information of a content will be described through use of a configuration of a screen illustrated in FIG. 6. FIG. 6 is a diagram illustrating a configuration of a screen of a content that is displayed in an electronic device according to various embodiments of the present disclosure. In the following descriptions, an electronic device may include some or all of the electronic device 101 of FIG. 1, the electronic device 201 of FIG. 2, and the electronic device 400 of FIG. 4.

Referring now to FIG. 5, in operation 501, the electronic device displays a content in a display screen of the electronic device. According to an embodiment of the present disclosure, the processor 120 may render a content to be displayed in the display 160 by parsing components of the content. The display 160 may display a content in the form of a card such as shown in FIG. 6, which includes a title area 601, a description area 603, an image area 605 (e.g., a map), and a fragment area 607. In this instance, the processor 120 may generate an image associated with each area 601, 603, 605, or 607 of the content, through rendering. Here, the components of the content may be configured in the form of a markup language.

In operation 503, the electronic device detects, from the content, at least one shared area to be shared with an external device. According to an embodiment of the present disclosure, the processor 120 may determine at least one shared area that is set in a share-tag (e.g., a "share" tag) in the configuration data of the content. For example, the shared area set in the share-tag may be determined when the content is generated, or may be added by a shared area setting event.

In operation 505, the electronic device generates a captured image that includes at least one piece of shared area information from the content. According to an embodiment of the present disclosure, the processor 120 may extract a rendered image corresponding to at least one shared area from the images associated with areas forming the content, which are generated through rendering, and may generate a single captured image. According to an embodiment of the present disclosure, the processor 120 may extract tag information associated with at least one shared area, and may generate the configuration data of a captured image. The processor 120 may parse the configuration data of the captured image, and may render the captured image.

Figure 7:
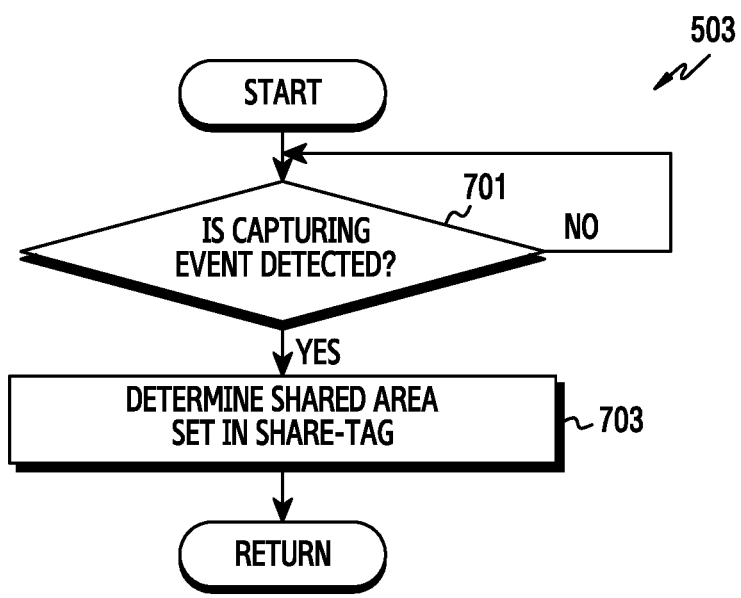
FIG. 7 is a flowchart illustrating an operational example of a process in which an electronic device determines shared area information set in a share-tag according to various embodiments of the present disclosure.
Figure 8:
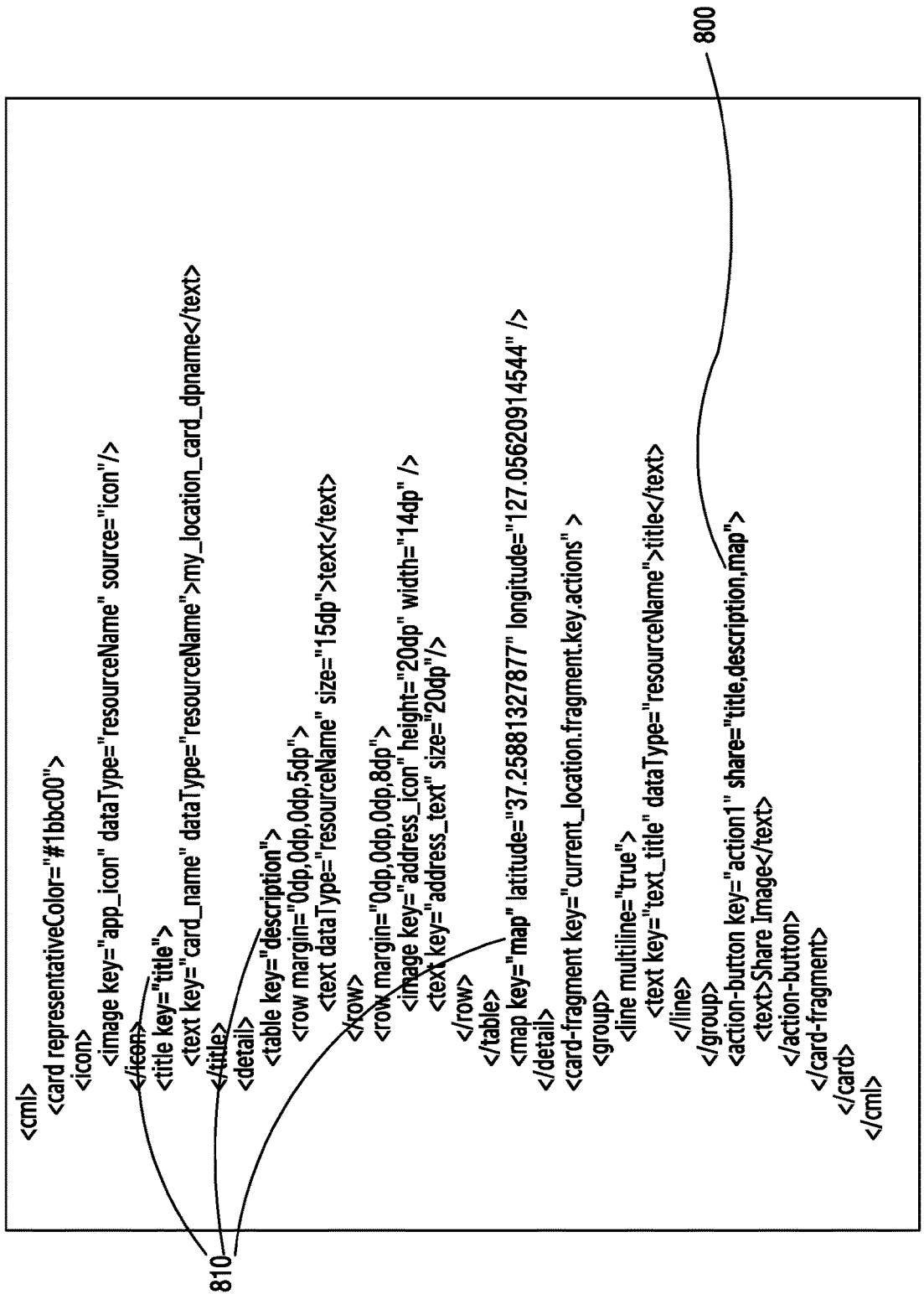
FIG. 8 is a diagram illustrating content information in the form of a markup language in an electronic device according to various embodiments of the present disclosure.

FIG. 7 is a flowchart illustrating an operational example of a process in which an electronic device determines shared area information set in a share-tag according to various embodiments of the present disclosure. Hereinafter, the operation of detecting a shared area, executed in operation 503 of FIG. 5, will be described through use of a configuration of a screen illustrated in FIG. 8. FIG. 8 is a diagram illustrating content information in the form of a markup language in an electronic device according to various embodiments of the present disclosure. In the following descriptions, an electronic device may include some or all of the electronic device 101 of FIG. 1, the electronic device 201 of FIG. 2, and the electronic device 400 of FIG. 4.

Referring now to FIG. 7, in operation 701, an electronic device may detect the occurrence of a capturing event. According to an embodiment of the present disclosure, the processor 120 may determine whether an input for selecting a button that corresponds to a capturing event is detected through the input/output interface 150. Here, the button may include a software button or a hardware button. According to an embodiment of the present disclosure, the processor 120 may determine, through a sensor module, whether a gesture input or a voice input corresponding to a capturing event is detected.

In operation 703, when the occurrence of the capturing event is detected, the electronic device may determine at least one shared area that is set in a share-tag (e.g., a "share" tag) in the configuration data of the content. According to an embodiment of the present disclosure, the processor 120 may parse the configuration data of a content that is configured in the form of a markup language, as illustrated in FIG. 8, and may render the content, as illustrated in FIG. 6. When the occurrence of the capturing event is detected, the processor 120 may determine, as a shared area, a title area, a description area, and an image area, which are set in a share-tag 800 in the configuration data of the content. For example, the share-tag may include information associated with at least one shared area that is determined when the content is generated, out of the areas to which a key tag 810 is assigned in the configuration data of the content.

Figure 9:
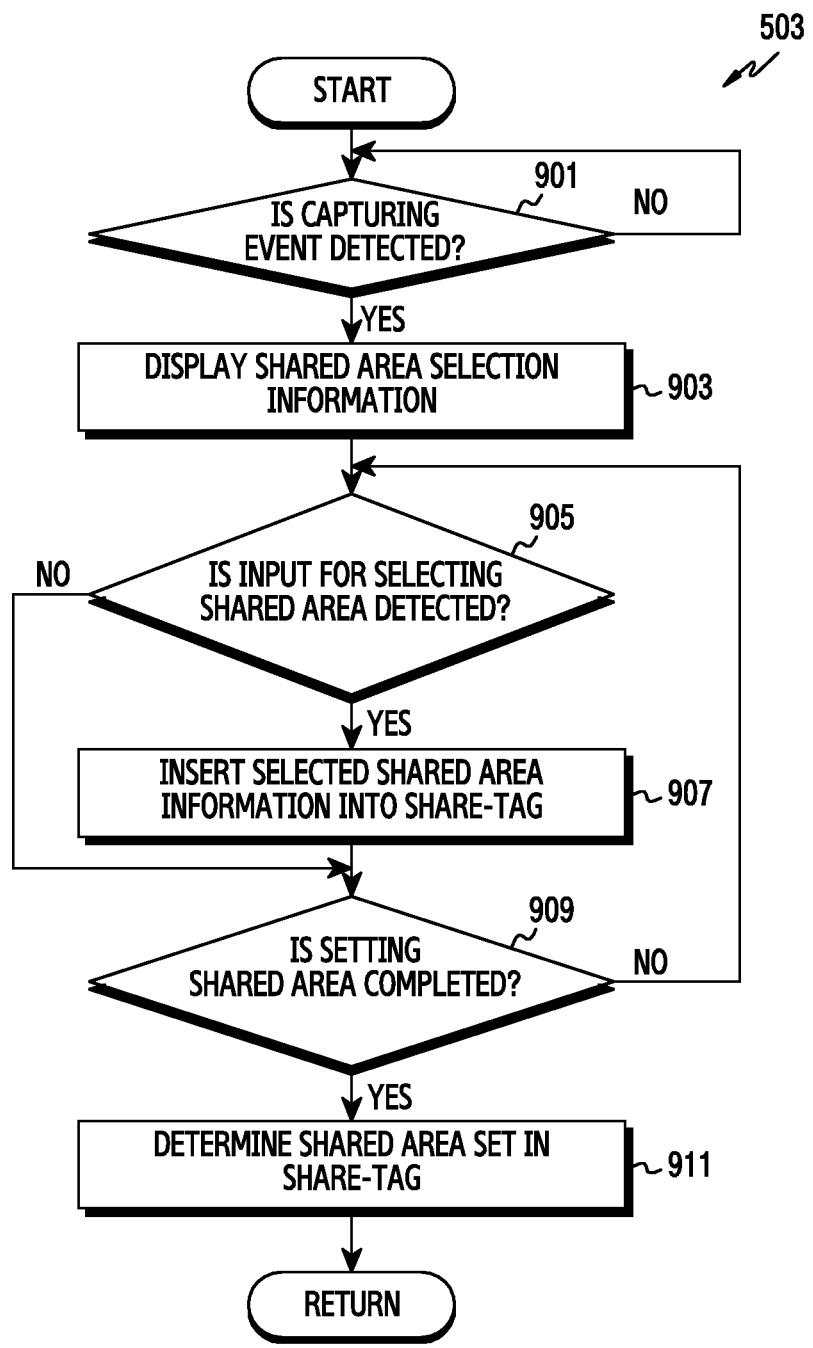
FIG. 9 is a flowchart illustrating an operational example of a process in which an electronic device updates setting information of a share-tag based on input information, according to various embodiments of the present disclosure.
Figure 10:
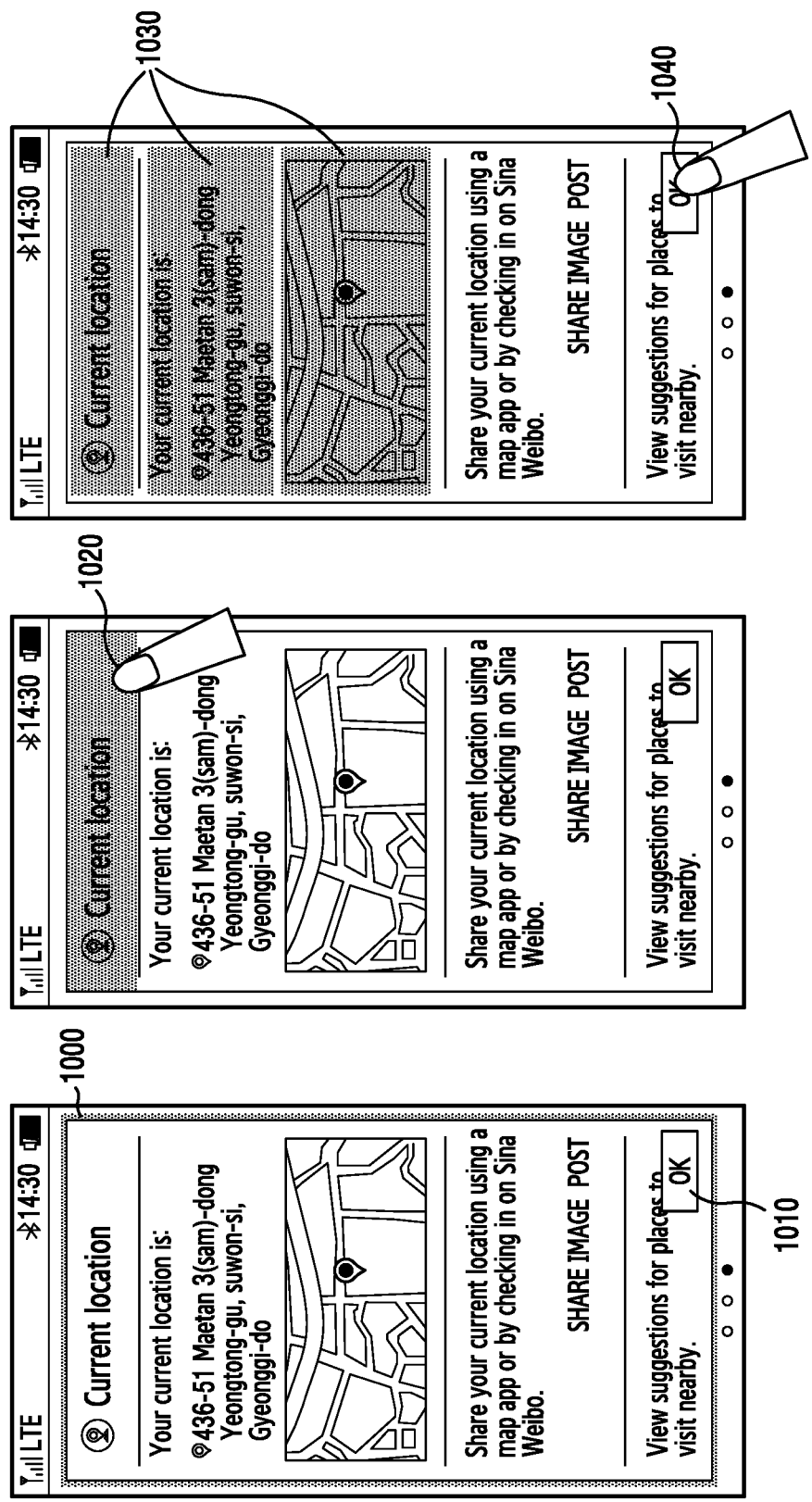
FIG. 10A, FIG. 10B and FIG. 10C are screen shots of an electronic device a diagram illustrating a configuration of a screen for setting a shared area in an electronic device according to various embodiments of the present disclosure.

FIG. 9 is a flowchart illustrating an operational example of a process in which an electronic device updates setting information of a share-tag based on input information, according to various embodiments of the present disclosure. Hereinafter, the operation of detecting a shared area, executed in operation 503 of FIG. 5, will be described through the use of a configuration of a screen illustrated in FIGS. 10A, 10B and 10C. FIGS. 10A, 10B and 10C are a diagram illustrating a configuration of a screen for setting a shared area in an electronic device according to various embodiments of the present disclosure. In the following descriptions, an electronic device may include some or all of the electronic device 101 of FIG. 1, the electronic device 201 of FIG. 2, and the electronic device 400 of FIG. 4.

Referring to FIG. 9, in operation 901, an electronic device may detect the occurrence of a capturing event for extracting shared information from a content displayed in a display. According to an embodiment of the present disclosure, the processor 120 may determine whether an input of selecting a button, a gesture input, or a voice input, which corresponds to a capturing event, is detected.

In operation 903, when the occurrence of the capturing event is detected, the electronic device displays shared area selection information in at least a partial area of the display so that a user may recognize a point in time when to select a shared area. According to an embodiment of the present disclosure, the processor 120 may display, in at least a partial area of the display 160, a guidance message that requests selecting a shared area. According to an embodiment of the present disclosure, the processor 120 may update a display parameter 1000 associated with at least a partial area of the content displayed in the display 160, as illustrated in FIG. 10A, so that a user may recognize a capturing event occurrence information. Here, the display parameter of the content may include at least one of color, shadow, and transparence. In addition, the processor 120 may display an "ok" button 1010 for setting a point in time when setting a shared area is completed, in at least a partial area of the display 160.

In operation 905, the electronic device may determine whether an input for selecting a shared area is detected. According to an embodiment of the present disclosure, the processor 120 may determine whether a touch input or a hovering input for selecting at least a partial area (e.g., a card area) from the content displayed in the display 160 is detected. According to an embodiment of the present disclosure, the processor 120 may determine whether a touch input or a hovering input for setting a shared area out of the content displayed in the display 160 is detected.

In operation 909, when the input for selecting a shared area is not detected, the electronic device determines whether the setting of a shared area is complete. According to an embodiment of the present disclosure, the processor 120 may determine whether an input on the "ok" button 1010 is detected in FIG. 10A.

In operation 907, when the input for selecting a shared area is detected, the electronic device may insert information associated with the corresponding area into a share-tag of the content. According to an embodiment of the present disclosure, when a touch input 1020 on a title area (e.g., a card area) is detected in the content displayed in the display 160, as illustrated in FIG. 10B, the processor 120 may insert title area information into a share-tag of the content. Additionally, the processor 120 may update a display parameter of the title area that is inserted into the share-tag, so that a user may recognize an area that is inserted into the share-tag. For example, when a key tag is not assigned to the title area where the touch input 1020 is detected, the processor 120 may restrict inserting the title area into the share-tag.

In operation 909, the electronic device determines whether setting the shared area is completed. According to an embodiment of the present disclosure, the processor 120 may determine, through the input/output interface 150, whether an input of selecting a button that corresponds to the completion of setting a shared area is detected. Here, the button may include a software button or a hardware button. According to an embodiment of the present disclosure, the processor 120 may determine, through a sensor module, whether a gesture input or a voice input corresponding to the completion of setting a shared area is detected.

When setting a shared area is not completed, the electronic device determines whether an input for selecting a shared area is detected in operation 905.

In operation 911, when setting of a shared area is completed, the electronic device determines a shared area that is set in a share-tag. According to an embodiment of the present disclosure, when an input 1040 of the "ok" button 1010 is detected, as illustrated in FIG. 10C, the processor 120 may determine the areas 1030 set in the share-tag (e.g., a title area, a description area, and an image area (e.g., a map area)), as a shared area.

Figure 11:
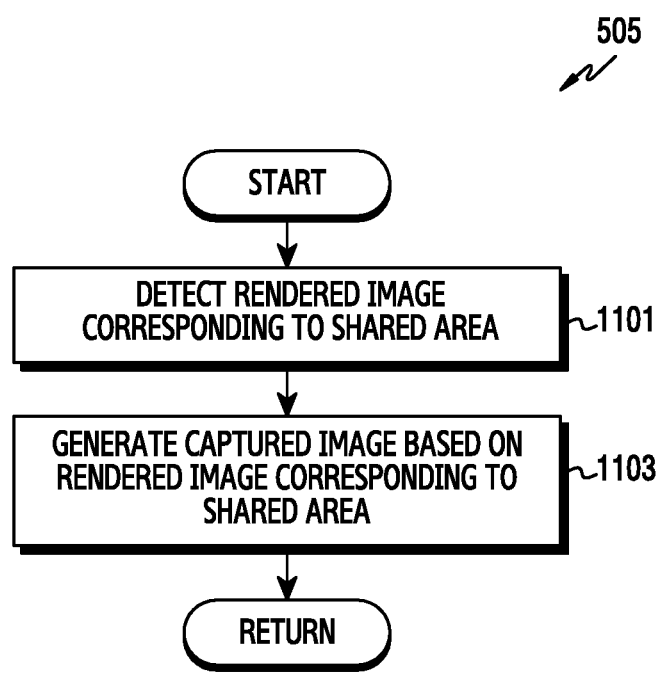
FIG. 11 is a flowchart illustrating an operational example of a process in which an electronic device generates a captured image using a rendered image according to various embodiments of the present disclosure.

FIG. 11 is a flowchart illustrating an operational example of a process in which an electronic device generates a captured image using a rendered image according to various embodiments of the present disclosure. Hereinafter, the operation of generating a captured image, executed in operation 505 of FIG. 5, will be described through use of a configuration of a screen illustrated in FIGS. 12A, 12B, 12C, and 12D. FIGS. 12A, 12B, 12C, and 12D are a diagram illustrating a configuration of a screen for an electronic device to generate a captured image using a rendered image according to various embodiments of the present disclosure. In the following descriptions, an electronic device may include some or all of the electronic device 101 of FIG. 1, the electronic device 201 of FIG. 2, and the electronic device 400 of FIG. 4.

Figure 12A:
FIG. 12A, FIG. 12B, FIG. 12C are portions of a screenshot shown in FIG. 12D illustrating a configuration of a screen for an electronic device to generate a captured image using a rendered image according to various embodiments of the present disclosure.
Figure 12B:
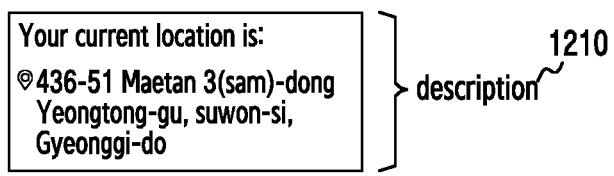
Figure 12C:
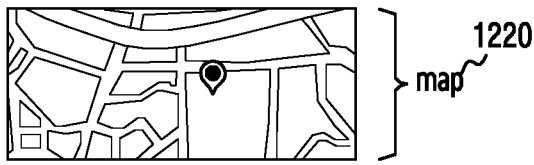

Referring now to FIG. 11, in operation 1101, an electronic device may detect a rendered image corresponding to a shared area from a rendered image associated with a content. According to an embodiment of the present disclosure, the processor 120 may determine, as a shared area, the title area 601, the description area 603, and the image area 605 included in a share-tag, out of the areas forming the content in FIG. 6. The processor 120 may detect a rendered image 1200, 1210, and 1220 corresponding to each shared area from the image of the content that is rendered to be displayed in the display 160, as illustrated in FIGS. 12A to 12C.

Figure 12D:
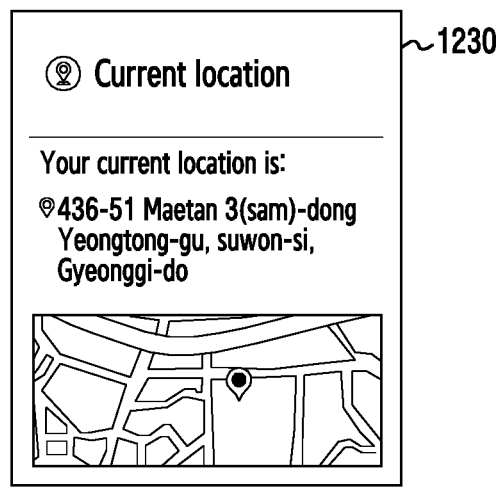

In operation 1103, the electronic device generates a single captured image based on the rendered image corresponding to the shared area. According to an embodiment of the present disclosure, the processor 120 may set a background of the captured image, based on the size of the rendered image corresponding to the shared area. For example, the processor 120 may set a background identical to the content displayed in the display 160. The processor 120 may generate a single captured image 1230 by disposing the rendered image 1200 to 1220 which corresponds to each shared area, in the background of the captured image, as illustrated in FIG. 12D. For example, the processor 120 may set the location of the rendered image 1200 to 1220, which is disposed in the background, to be different from the configuration of the content.

Figure 13:
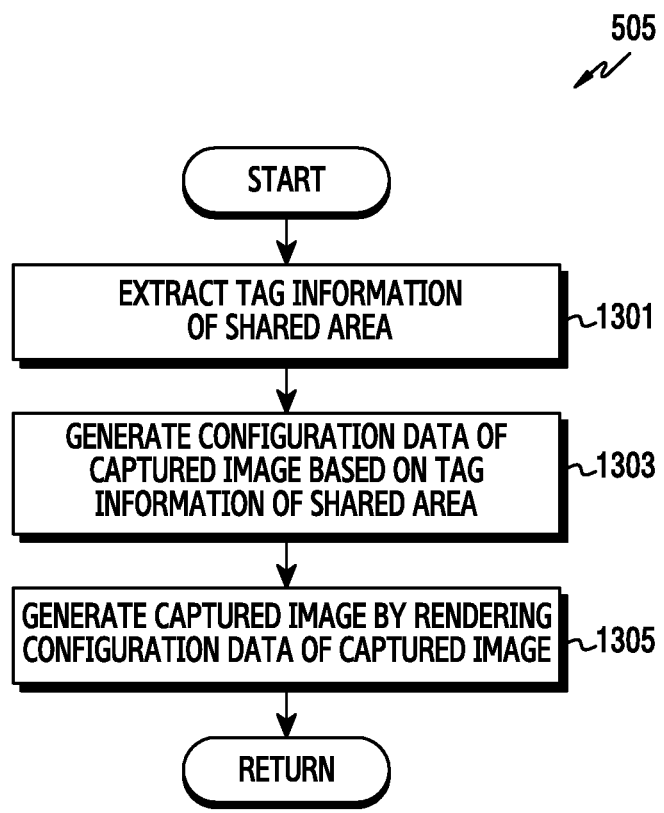
FIG. 13 is a flowchart illustrating an operational example of a process in which an electronic device renders a captured image according to various embodiments of the present disclosure.

FIG. 13 is a flowchart illustrating an operational example of a process in which an electronic device renders a captured image according to various embodiments of the present disclosure. Hereinafter, the operation of generating a captured image, executed in operation 505 of FIG. 5, will be described. In the following descriptions, an electronic device may include some or all of the electronic device 101 of FIG. 1, the electronic device 201 of FIG. 2, and the electronic device 400 of FIG. 4.

Referring now to FIG. 13, in operation 1301, an electronic device extracts tag information corresponding to a shared area, from the configuration data of a content. According to an embodiment of the present disclosure, the processor 120 determines a title area, a description area, and an image area included in the share-tag 800 of FIG. 8, as a shared area. The processor 120 may extract tag information associated with each shared area from the configuration data of the content (e.g., a CML document), as illustrated in FIG. 8.

In operation 1303, the electronic device generates the configuration data of a captured image based on the tag information corresponding to the shared area, which is extracted from the configuration data of the content. According to an embodiment of the present disclosure, the processor 120 may extract tag information of the title area, the description area, and the image area, which are included in the share-tag 800, and may generate the configuration data of a captured image in the form of a markup language.

In operation 1305, the electronic device may generate a single captured image by rendering the configuration data of the captured image. According to an embodiment of the present disclosure, the processor 120 may parse the configuration data of the captured image, and may render the captured image. Accordingly, the processor 120 may generate the captured image in a different format (e.g., size) from the image of the shared area included in the content.

According to various embodiments of the present disclosure, the electronic device may generate a captured image using information associated with a shared area, which is set in a shared tag, and thus, may generate the captured image including information that is not displayed in the display, as illustrated in FIGS. 11 and 13.

Figure 14:
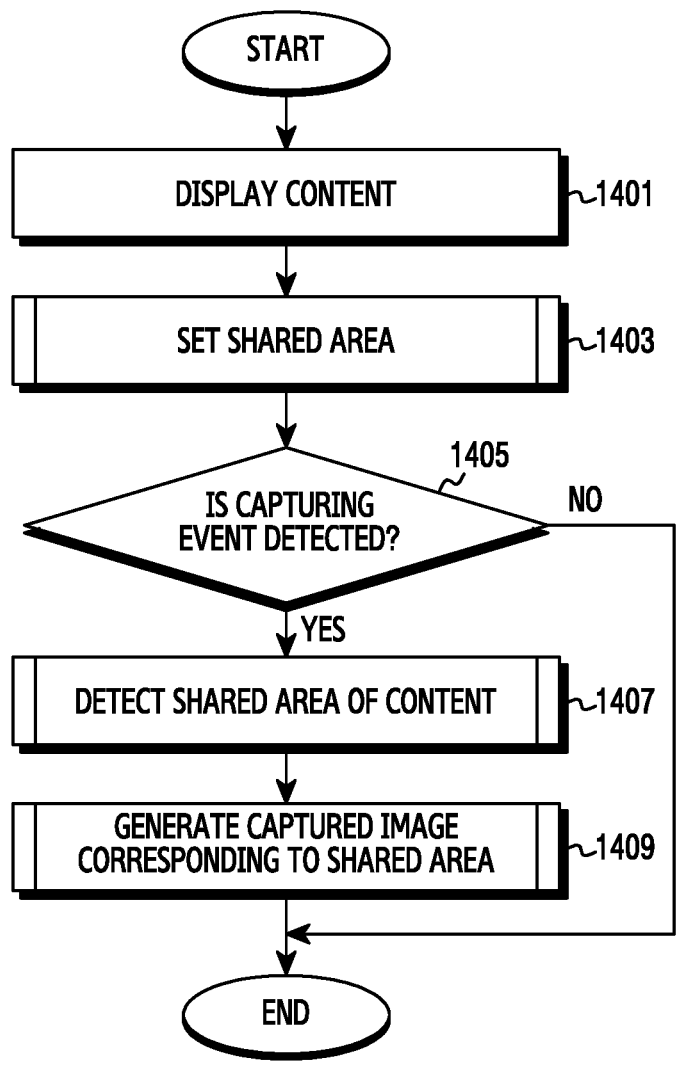
FIG. 14 is a flowchart illustrating an operational example of a process in which an electronic device captures at least a partial area set based on input information according to various embodiments of the present disclosure.

FIG. 14 is a flowchart illustrating an operational example of a process in which an electronic device captures at least a partial area set based on input information according to various embodiments of the present disclosure. In the following descriptions, an electronic device may include some or all of the electronic device 101 of FIG. 1, the electronic device 201 of FIG. 2, and the electronic device 400 of FIG. 4.

Referring now to FIG. 14, in operation 1401, an electronic device displays, in the display of the electronic device, a content (e.g., an execution screen) as an application program is driven. According to an embodiment of the present disclosure, the processor 120 may control the display 160 to display a content in the form of a card, which includes the title area 601, the description area 603, the image area 605 (e.g., a map), and the fragment area 607.

In operation 1403, the electronic device sets a shared area that includes information to be shared with an external device in a content displayed in the display. According to an embodiment of the present disclosure, when the occurrence of a shared area selecting event is detected, the processor 120 may set at least one shared area based on a touch input or a hovering input with respect to the content displayed in the display 160. For example, the processor 120 may insert a property parameter (e.g., a capture-tag) that indicates a shared area into a card area where a touch input or a hovering input is detected in the content displayed in the display 160. For example, the processor 120 may add, to a share-tag, the card area where a touch input or a hovering input is detected in the content displayed in the display 160.

In operation 1405, the electronic device determines whether the occurrence of a capturing event is detected. According to an embodiment of the present disclosure, the processor 120 may determine whether an input of selecting a button that corresponds to the occurrence of a capturing event is detected, through the input/output interface 150. According to an embodiment of the present disclosure, the processor 120 may determine, through a sensor module, whether a gesture input or a voice input corresponding to the occurrence of a capturing event is detected.

In operation 1407, the electronic device detects, from the content, at least one shared area to be shared with an external device when the occurrence of the capturing event is detected. According to an embodiment of the present disclosure, the processor 120 may determine, as a shared area, at least one area that includes a property parameter (e.g., a capture-tag) indicating a shared area, in the configuration data of the content. According to an embodiment of the present disclosure, the processor 120 may determine at least one shared area that is added to a share-tag (e.g., a "share" tag), in the configuration data of the content, as illustrated in FIG. 7.

In operation 1409, the electronic device generates a captured image based on information associated with the at least one shared area. According to an embodiment of the present disclosure, the processor 120 extracts a rendered image corresponding to at least one shared area, and may generate a single captured image, as illustrated in FIG. 11. According to an embodiment of the present disclosure, the processor 120 may parse the configuration data of the captured image, and may render the captured image, as illustrated in FIG. 13.

Figure 15:
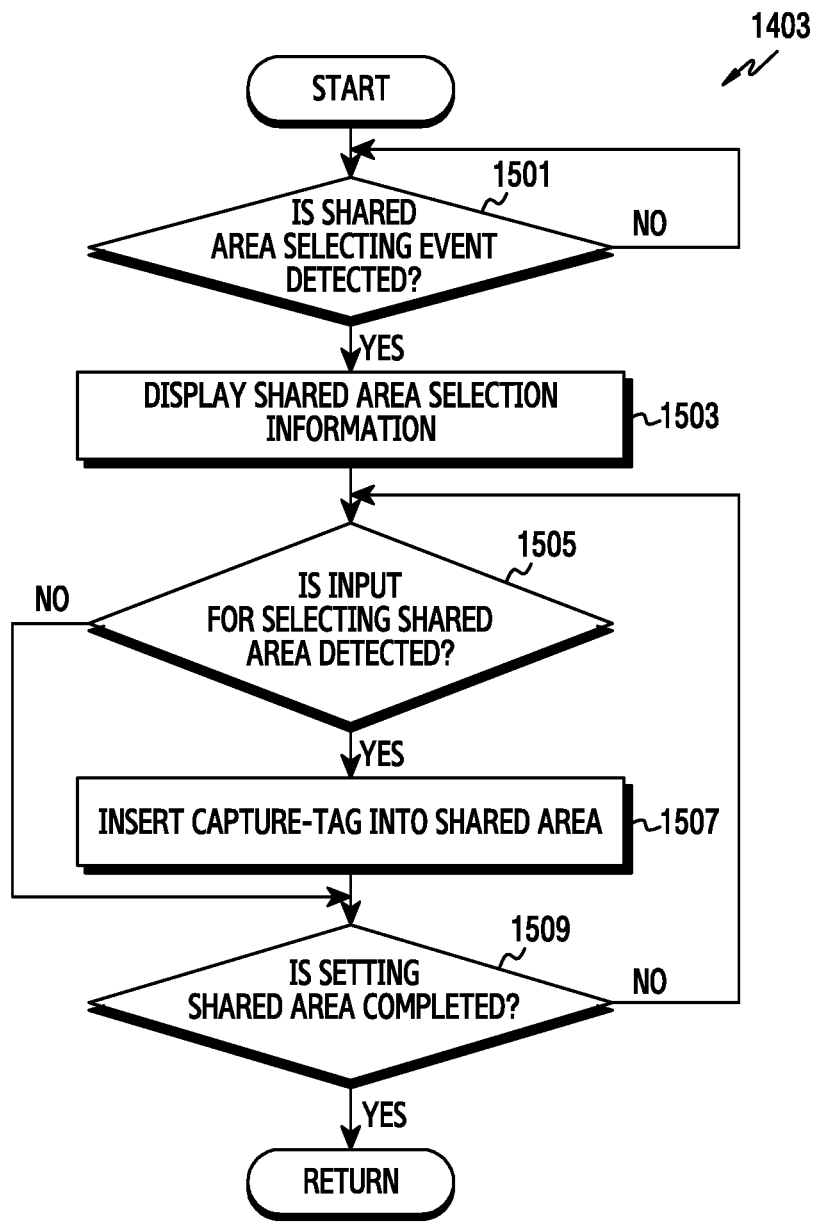
FIG. 15 is a flowchart illustrating an operational example of a process in which an electronic device sets at least a partial area to be shared based on input information according to various embodiments of the present disclosure.

FIG. 15 is a flowchart illustrating an operational example of a process in which an electronic device sets at least a partial area to be shared, based on input information according to various embodiments of the present disclosure. Hereinafter, the operation of setting a shared area, executed in operation 1403 of FIG. 14, will be described. In the following descriptions, an electronic device may include some or all of the electronic device 101 of FIG. 1, the electronic device 201 of FIG. 2, and the electronic device 400 of FIG. 4.

Referring now to FIG. 15, in operation 1501, an electronic device determines whether the occurrence of an event for selecting a shared area is detected. For example, the processor 120 may determine whether a button input, a gesture input, and a voice input, which correspond to an event for selecting a shared area, is detected.

In operation 1503, when the occurrence of the event for selecting a shared area is detected, the electronic device displays shared area selection information in at least a partial area of a display. According to an embodiment of the present disclosure, the processor 120 may display, in at least a partial area of the display 160, a pop-up window including information that requests selecting a shared area. According to an embodiment of the present disclosure, the processor 120 may control the display 160 to update a display parameter 1000 with respect to at least a partial area of the content displayed in the display 160, so as to display information indicating the occurrence of an event for selecting a shared area.

In operation 1505, the electronic device may determine whether an input for selecting a shared area is detected. According to an embodiment of the present disclosure, the processor 120 may determine whether a touch input or a hovering input for selecting at least one shared area is detected.

When the input for selecting a shared area is not detected, the electronic device determines whether setting of a shared area is completed in operation 1509. According to an embodiment of the present disclosure, the processor 120 may determine whether an input on a button for completing setting (e.g., the "ok" button 1010 of FIG. 10A) is detected. According to an embodiment of the present disclosure, the processor 120 may determine whether a gesture input or a voice input, which corresponds to the completion of the setting, is detected.

In operation 1507, when the input for selecting a shared area is detected, the electronic device inserts a property parameter (e.g., a capture-tag) indicating a shared area, into the configuration data associated with at least one area where the input is detected. According to an embodiment of the present disclosure, the processor 120 may insert a capture-tag to the configuration data of at least one area where a touch input or a hovering input is detected in the content displayed in the display 160.

In operation 1509, the electronic device determines whether setting the shared area is completed. According to an embodiment of the present disclosure, the processor 120 may determine whether a button input, a gesture input, or a voice input, which corresponds to the completion of setting, is detected.

When setting a shared area is not completed, the electronic device determines whether an input for selecting a shared area is detected in operation 1505.

Figure 16:
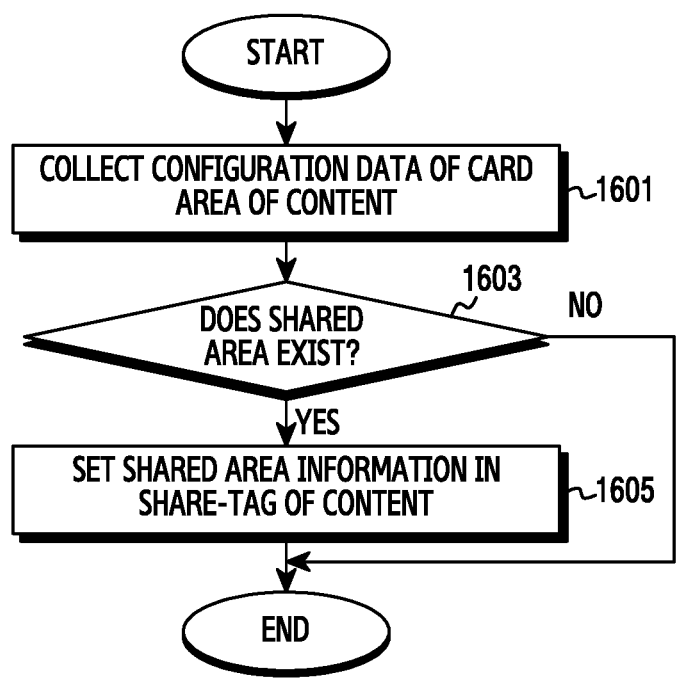
FIG. 16 is a flowchart illustrating an operational example of a process in which an electronic device generates a content according to various embodiments of the present disclosure.

FIG. 16 is a flowchart illustrating an operational example of a process in which an electronic device generates a content according to various embodiments of the present disclosure. In the following descriptions, an electronic device may include some or all of the electronic device 101 of FIG. 1, the electronic device 201 of FIG. 2, and the electronic device 400 of FIG. 4.

Referring now to FIG. 16, in operation 1601, an electronic device collects configuration data associated with a card area of a content. According to an embodiment of the present disclosure, the processor 120 may generate configuration data associated with each card area that forms the content, by collecting at least some configuration data associated with at least one difference content.

In operation 1603, the electronic device determines whether a card area exists, which is to be set as a shared area from among card areas forming the content. According to an embodiment of the present disclosure, the processor 120 may determine whether at least one card area that is to be set as a shared area is selected based on input information through the input/output interface 150. For example, the processor 120 may determine whether at least one card area that is to be set as a shared area is selected from among the card areas to which a key-tag is assigned. According to an embodiment of the present disclosure, the processor 120 may determine whether at least one card area that is to be set as a shared area exists, based on the characteristics of the card areas forming the content. Here, the characteristics of the card area may include at least one of a type of tag included in the card area or a type of data included in the card area.

In operation 1605, when a card area that is to be set as a shared area exists, the electronic device inserts information associated with the card area to be set as a shared area into a share-tag of the content. According to an embodiment of the present disclosure, when a title area, a description area, and an image area are set as a shared area, the processor 120 may insert information associated with the title area, the description area, and the image area, into a share-tag (e.g., a "share" tag), as illustrated in FIG. 8.

Figure 17:
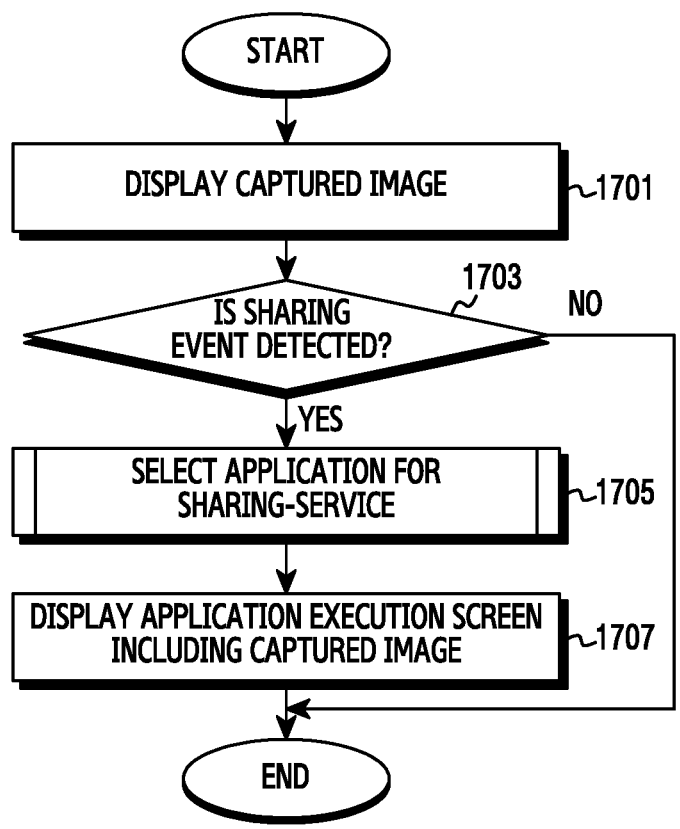
FIG. 17 is a flowchart illustrating an operational example of a process in which an electronic device shares a captured image according to various embodiments of the present disclosure.

FIG. 17 is a flowchart illustrating an operational example of a process in which an electronic device shares a captured image according to various embodiments of the present disclosure. Hereinafter, the operation of sharing a captured image will be described through the use of a configuration of a screen illustrated in FIGS. 18A, 18B, 18C, 18D, 18E and 18F. FIGS. 18A, 18B, 18C, 18D, 18E and 18F are a diagram illustrating a configuration of a screen for an electronic device to share a captured image according to various embodiments of the present disclosure. In the following descriptions, an electronic device may include some or all of the electronic device 101 of FIG. 1, the electronic device 201 of FIG. 2, and the electronic device 400 of FIG. 4.

Figure 18A:
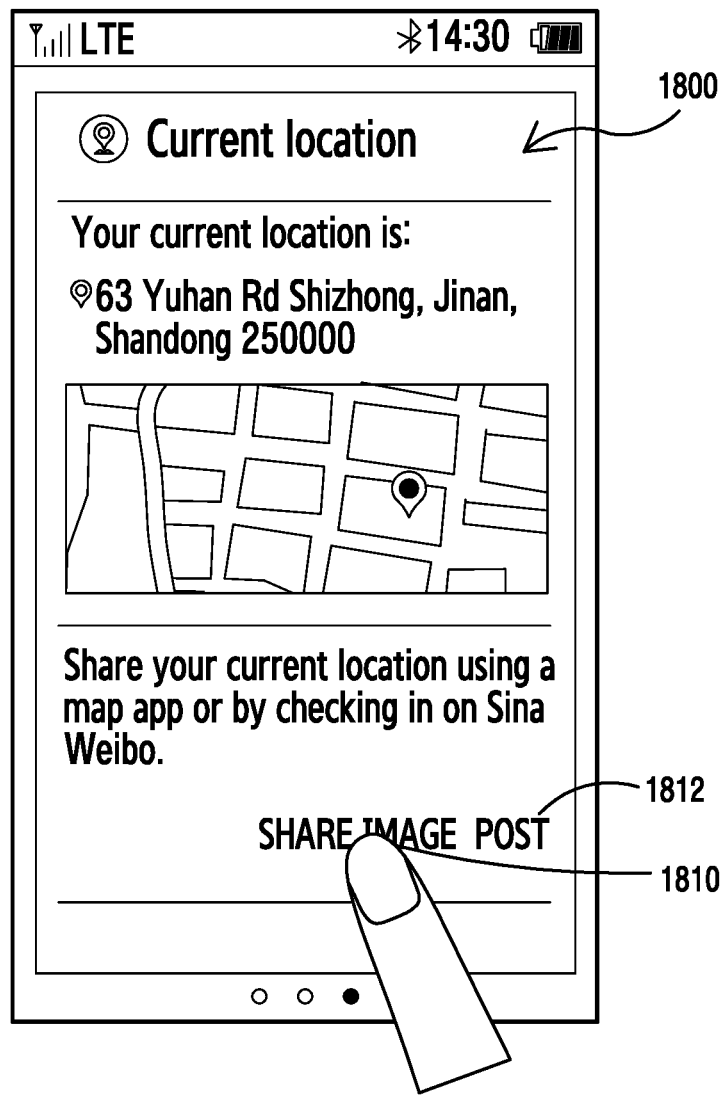
FIG. 18A, FIG. 18B, FIG. 18C, FIG. 18D, FIG. 18E and FIG. 18F are illustrations of a screen configuration for an electronic device to share a captured image according to various embodiments of the present disclosure.

Referring now to FIG. 17, in operation 1701, an electronic device displays, in a display, a captured image including at least some information of a content. According to an embodiment of the present disclosure, the processor 120 may extract information associated with at least one shared area included in the content, and may generate a captured image. The processor 120 may control the display 160 so as to display a captured image 1800, as illustrated in FIG. 18A. In addition, the display 160 may display, in at least a partial area, a first share button (e.g., "share image") 1810 for sharing a captured image and a second share button (e.g., "POST") 1812 for sharing text.

In operation 1703, the electronic device detects the occurrence of a sharing event with respect to the captured image. According to an embodiment of the present disclosure, the processor 120 may determine whether an input on the first share button 1810 of FIG. 18A is detected, based on input information detected through the input/output interface 150. According to an embodiment of the present disclosure, the processor 120 may determine whether a gesture input or a voice input, which corresponds to the sharing event, is detected.

In operation 1705, when the electronic device detects the occurrence of the sharing event with respect to the captured image, the electronic device selects an application for a sharing service. According to an embodiment of the present disclosure, the processor 120 may select an application to be used for transmitting the captured image from among applications that are capable of transmitting data to an external device.

Figure 18B:
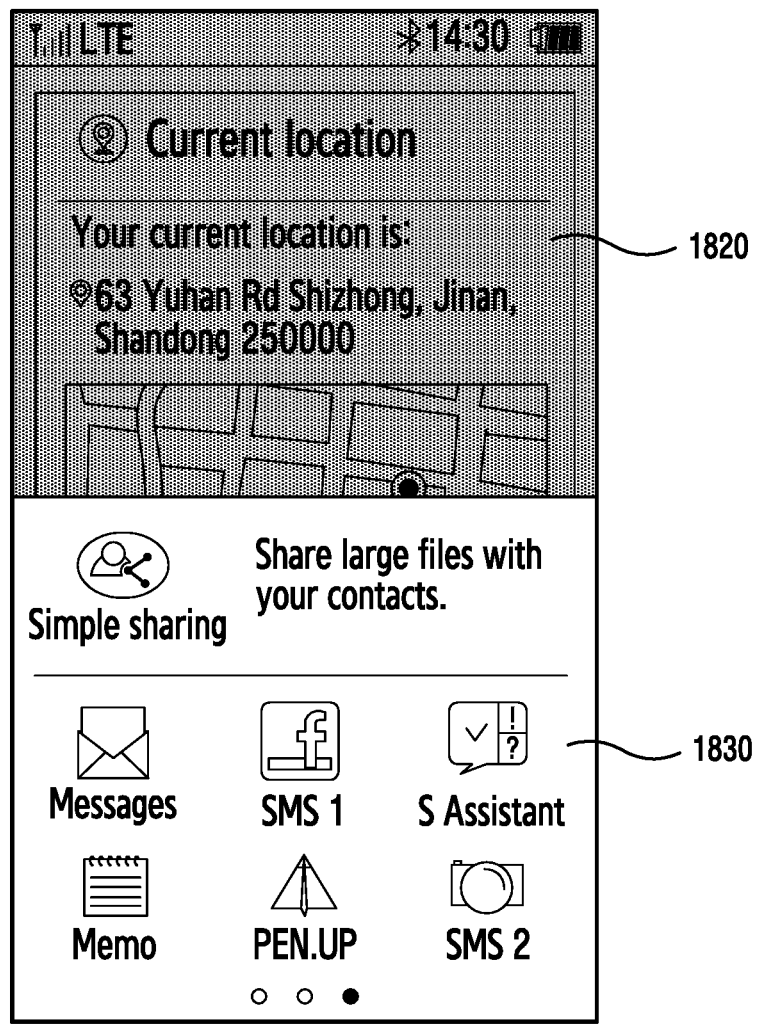
Figure 18C:
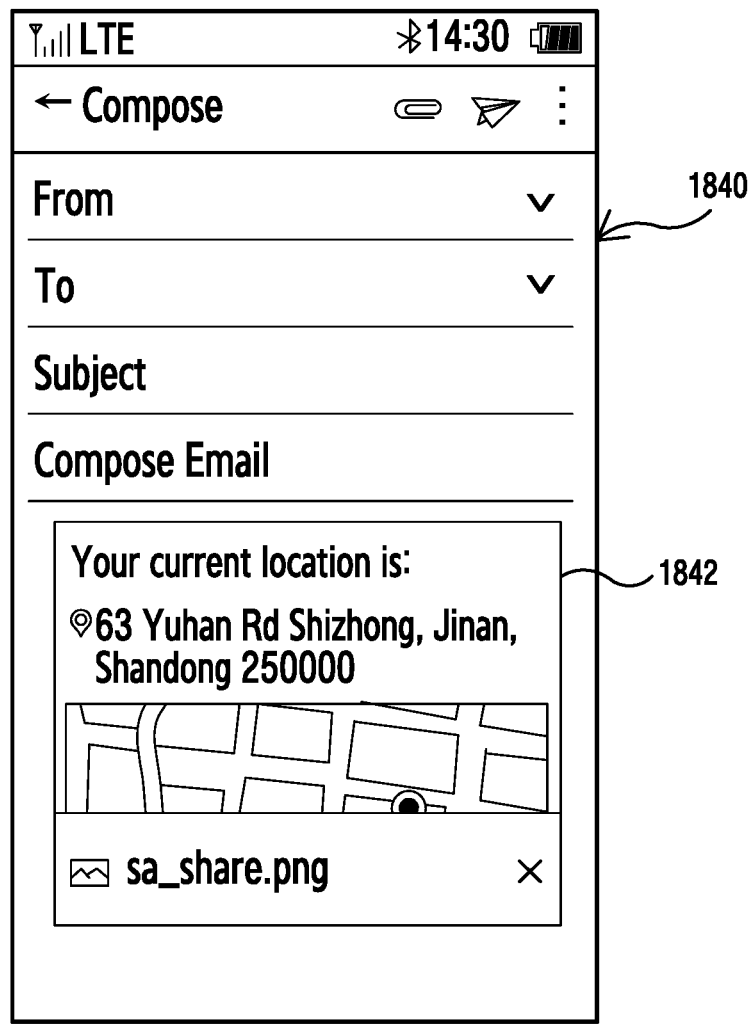
Figure 18D:
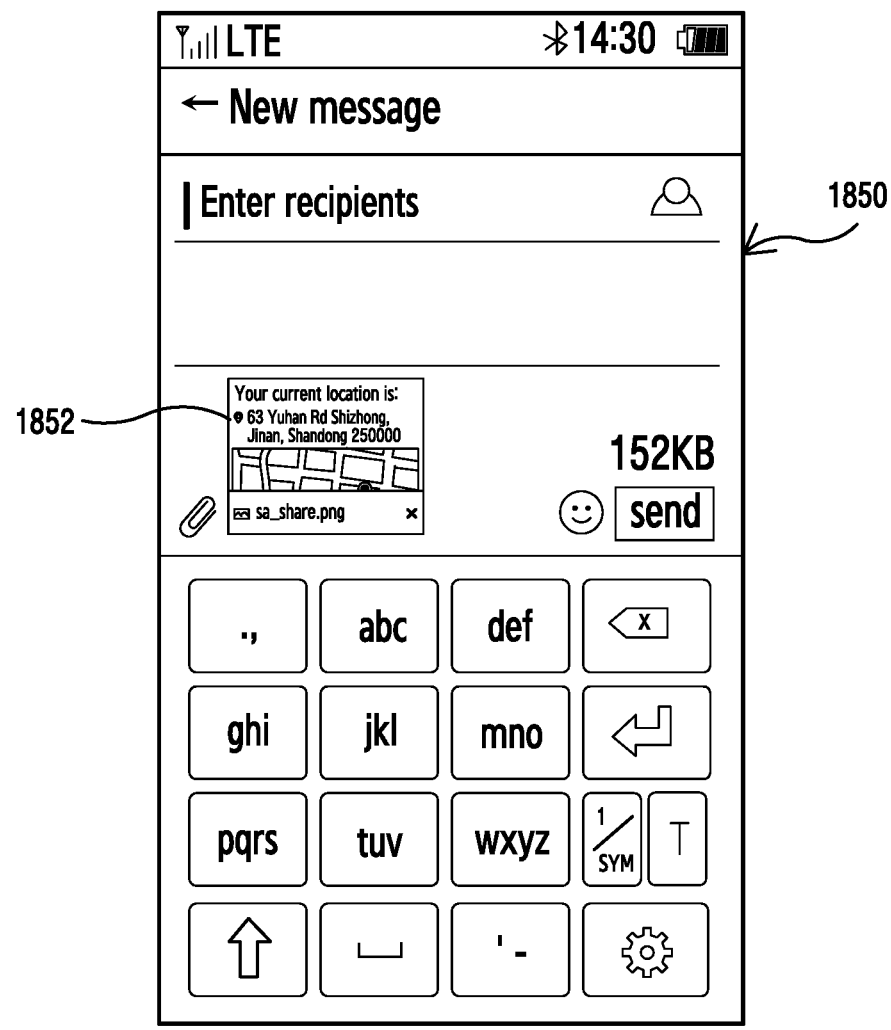
Figure 18E:
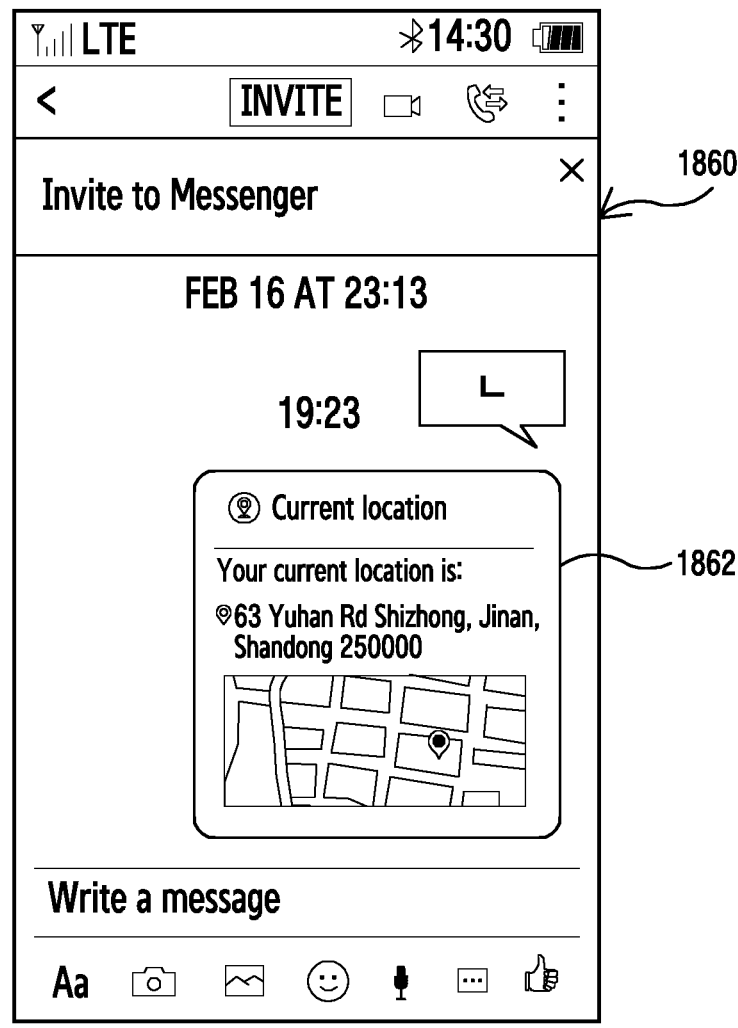
Figure 18F:
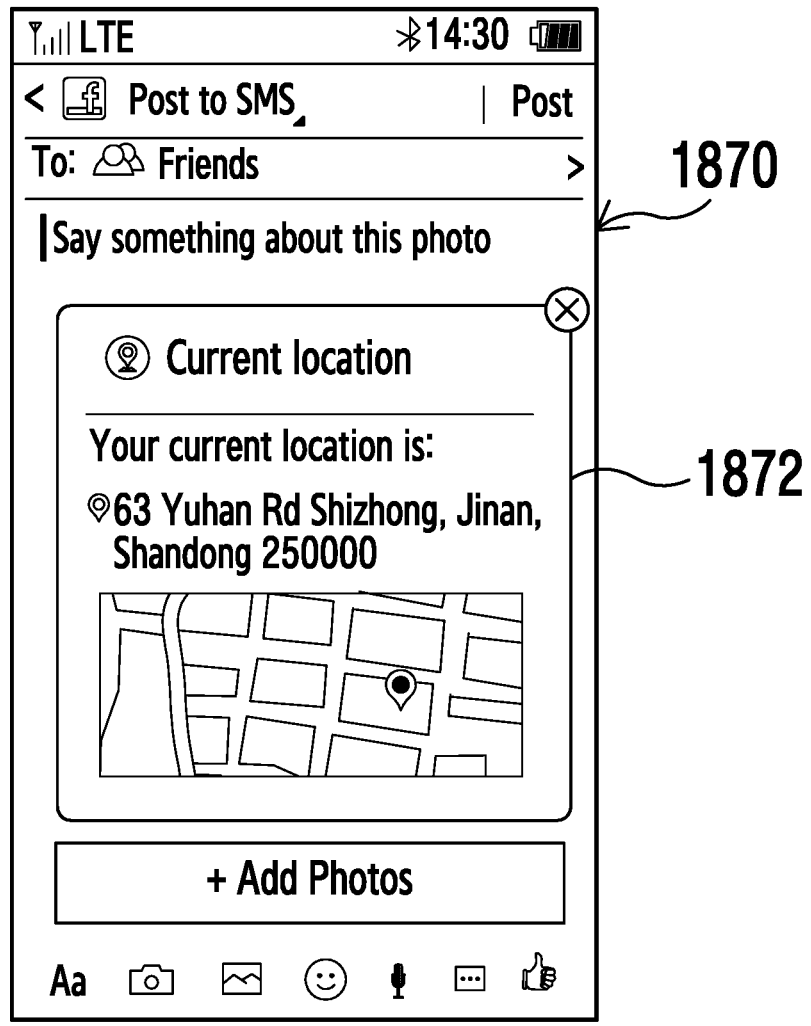

In operation 1707, the electronic device adds the captured image to an execution screen of the application for the sharing service. According to an embodiment of the present disclosure, when a mail-application is selected, the processor 120 may control the display 160 to display an execution screen 1840 of the mail-application that includes a captured image 1842, as illustrated in FIG. 18C. For example, the processor 120 may attach the captured image to a mail input window in the execution screen 1840 of the mail application. According to an embodiment of the present disclosure, when a text message application is selected, the processor 120 may control the display 160 to display an execution screen 1850 of the text message application that includes a captured image 1852, as illustrated in FIG. 18D. For example, the processor 120 may attach the captured image to the text input window in the execution screen 1850 of the text message application. According to an embodiment of the present disclosure, when a messenger application is selected, the processor 120 may control the display 160 to display an execution screen 1860 of the messenger application that includes a captured image 1862, as illustrated in FIG. 18E. For example, the processor 120 may transmit the captured image to an external device through the messenger application. Accordingly, the display 160 may display the captured image in a transmission message window in the execution screen 1860 of the messenger application. According to an embodiment of the present disclosure, when a social network application is selected, the processor 120 may control the display 160 to display an execution screen 1870 of the social network application that includes a captured image 1872, as illustrated in FIG. 18F. For example, the processor 120 may register the captured image in a social network through the social network application. Accordingly, the display 160 may display the captured image in a registration message window in the execution screen 1870 of the social network application.

Figure 19:
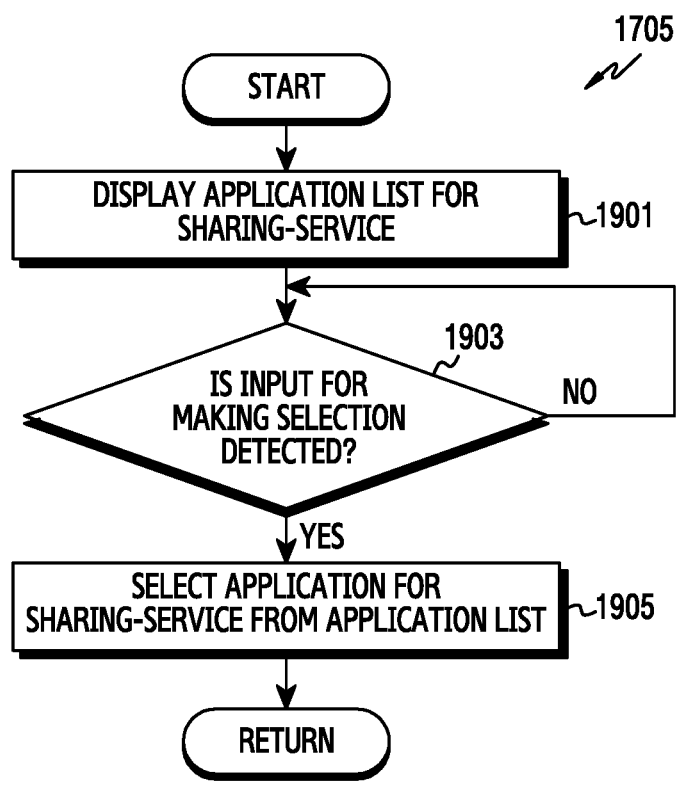
FIG. 19 is a flowchart illustrating an operational example of a process in which an electronic device selects a sharing application according to various embodiments of the present disclosure.

FIG. 19 is a flowchart illustrating an operational example of a process in which an electronic device selects a sharing application according to various embodiments of the present disclosure. Hereinafter, the operation of selecting an application for a sharing service, executed in operation 1705 of FIG. 17, will be described through use of a configuration of a screen illustrated in FIGS. 18A-18F. In the following descriptions, an electronic device may include some or all of the electronic device 101 of FIG. 1, the electronic device 201 of FIG. 2, and the electronic device 400 of FIG. 4.

Referring now to FIG. 19, in operation 1901, when the occurrence of a sharing event with respect to a captured image is detected, the electronic device displays a list of applications for a sharing service in a display. According to an embodiment of the present disclosure, when an input (e.g., a touch input) on the first share button 1810 of FIG. 18A is detected, the processor 120 may control the display 160 to display a list 1830 of applications that are capable of transmitting a captured image to an external device, as illustrated in FIG. 18B. Additionally, the display 160 may display a preview image 1820 of the captured image, in at least a partial area, as illustrated in FIG. 18B.

In operation 1903, the electronic device determines whether an input for making a selection with respect to the application list is detected. According to an embodiment of the present disclosure, the processor 120 may determine whether a touch input is detected with respect to one application in the application list 1830 displayed in the display 160.

In operation 1905, when the input for making a selection with respect to the application list is detected, the electronic device selects an application from which the input for making a selection is detected, from the application list displayed in the display, as an application to be used for transmitting the captured image.

Figure 20:
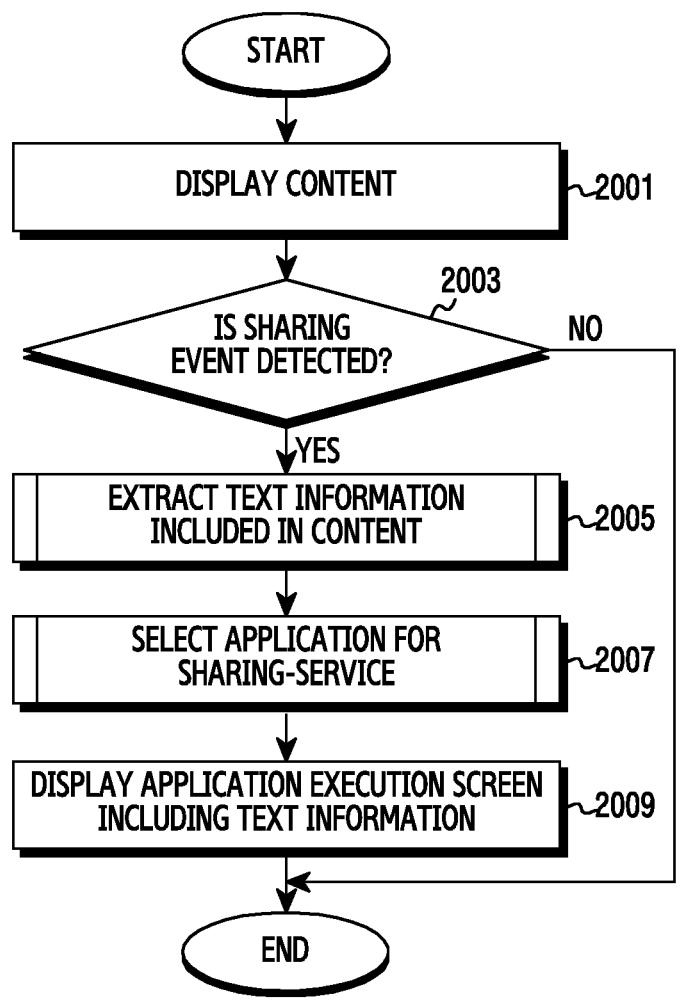
FIG. 20 is a flowchart illustrating an operational example of a process in which an electronic device shares text information according to various embodiments of the present disclosure.

FIG. 20 is a flowchart illustrating an example of an operational process in which an electronic device shares text information according to various embodiments of the present disclosure. In the following descriptions, an electronic device may include some or all of the electronic device 101 of FIG. 1, the electronic device 201 of FIG. 2, and the electronic device 400 of FIG. 4.

Referring now to FIG. 20, in operation 2001, an electronic device displays, in a display, a content (e.g., an execution screen) as an application program is driven. According to an embodiment of the present disclosure, the processor 120 may control the display 160 to display a content in the form of a card, which includes the title area 601, the description area 603, the image area 605 (e.g., a map), and the fragment area 607.

In operation 2003, the electronic device determines whether the occurrence of a sharing event associated with text information is detected. According to an embodiment of the present disclosure, the processor 120 may determine, through the input/output interface 150, whether an input for selecting a button (e.g., the second share button 1812 of FIG. 18A) corresponding to a sharing event of text information is detected. According to an embodiment of the present disclosure, the processor 120 may determine, through a sensor module, whether a gesture input or a voice input corresponding to a sharing event of text information is detected.

In operation 2005, when the occurrence of the sharing event associated with the text information is detected, the electronic device extracts the text information from the configuration data of the content. According to an embodiment of the present disclosure, the processor 120 may extract the text information included in a text-tag (e.g., text) in the configuration data of the content. According to an embodiment of the present disclosure, the processor 120 may detect at least one shared area from the configuration data of the content. The processor 120 may extract the text information included in the text-tag of the shared area.

In operation 2007, the electronic device selects an application for sharing the text information. According to an embodiment of the present disclosure, the processor 120 may select an application to be used for transmitting the text information from among applications that are capable of transmitting data to an external device, as illustrated in FIG. 19.

In operation 2009, the electronic device adds the text information to an execution screen of the application for the sharing service. According to an embodiment of the present disclosure, when the mail application is selected, the processor 120 may add the text information extracted in operation 2005 to a mail input window in the execution screen of the mail application. According to an embodiment of the present disclosure, when the text message application is selected, the processor 120 may add the text information extracted in operation 2005, to a text message input window in the execution screen of the text message application. According to an embodiment of the present disclosure, when the messenger application is selected, the processor 120 may add the text information extracted in operation 2005 to a message input window in the execution screen of the messenger application.

Figure 21:
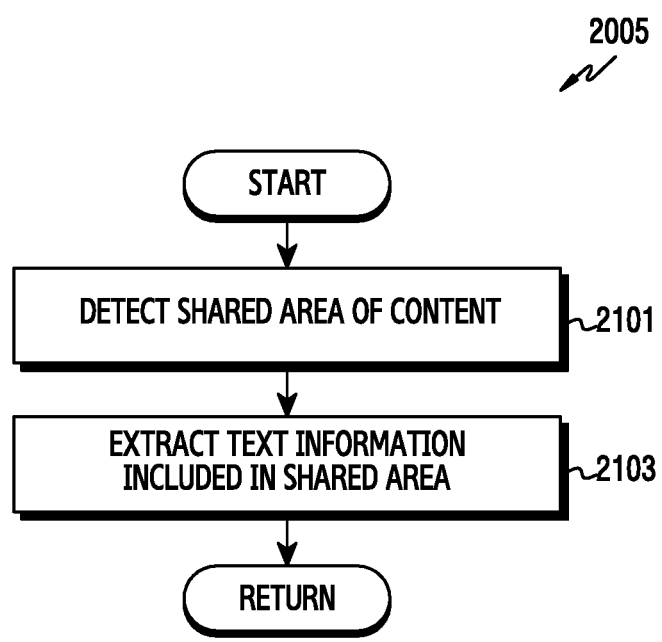
FIG. 21 is a flowchart illustrating an operational example of a process in which an electronic device extracts text information to be shared according to various embodiments of the present disclosure.

FIG. 21 is a flowchart illustrating an example of an operational process in which an electronic device extracts text information to be shared according to various embodiments of the present disclosure. Hereinafter, the operation of extracting text information, executed in operation 2005 of FIG. 20, will be described. In the following descriptions, an electronic device may include some or all of the electronic device 101 of FIG. 1, the electronic device 201 of FIG. 2, and the electronic device 400 of FIG. 4.

Referring now to FIG. 21, in operation 2101, the electronic device detects at least one shared area from a content displayed in a display. According to an embodiment of the present disclosure, the processor 120 may determine, as a shared area, at least one area that includes a property parameter (e.g., a capture-tag) indicating a shared area in the configuration data of the content. According to an embodiment of the present disclosure, the processor 120 may determine at least one piece of shared area information that is inserted into a share-tag (e.g., a "share" tag) in the configuration data of the content.

In operation 2103, the electronic device extracts text information included in the shared area. According to an embodiment of the present disclosure, the processor 120 may extract text information corresponding to a text-tag in the configuration data of the shared area.

According to various embodiments of the present disclosure, an operation method of an electronic device may include: displaying a content in a display of the electronic device; detecting at least one shared area from the content; and generating a single image based on information associated with the at least one shared area.

According to various embodiments of the present disclosure, the operation of displaying the content may include: rendering configuration data of the content that is in a form of a markup language, and displaying the content based on the rendered configuration data.

According to various embodiments of the present disclosure, the operation of detecting the shared area may include: detecting, from the configuration data of the content, at least one shared area information that is set in a share-tag.

According to various embodiments of the present disclosure, the share-tag may include at least one shared area information that is inserted based on input information.

According to various embodiments of the present disclosure, the operation of detecting the shared area may include: detecting, from the configuration data of the content, at least one area information to which a property parameter indicating a shared area is inserted.

According to various embodiments of the present disclosure, the operation of generating the single image may include: generating the single image based on at least one rendered image corresponding to the at least one shared area.

According to various embodiments of the present disclosure, the operation of generating the single image may include: extracting configuration data associated with the at least one shared area; generating configuration data of the image based on the configuration data associated with the at least one shared area; rendering the configuration data of the image, and generating the single image based on the rendered configuration data.

According to various embodiments of the present disclosure, the method may further include: selecting an application program for transmitting the single image; and displaying (or adding) the single image to an execution screen of the application program.

According to various embodiments of the present disclosure, the method may further include: generating a content including the at least one shared area information.

According to various embodiments of the present disclosure, the method may include: generating the content in the form of a card.

An electronic device and a method thereof, according to various embodiments of the present disclosure, may share partial information of a content with an external device by transmitting, to the external device, at least partial information of the content based on shared area information included in the configuration data (e.g., a markup language) of the content.

An electronic device and an operation method thereof, according to various embodiments of the present disclosure, may share content information intended by a user with an external device by configuring at least partial information of the content as a single image and transmitting the same to the external device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as by at least one processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry, such as integrated circuitry, that is configured for operation. Under the broadest reasonable interpretation, the appended claims constitute statutory subject matter in compliance with 35 U.S.C. § 101 and none of the elements are software per se.

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

What is claimed is:

1. An electronic device, the electronic device comprising:
   a display;
   a communication interface;
   at least one processor; and
   a memory operatively coupled to the at least one processor;
   wherein the memory is configured to store instructions that when executed configure the at least one processor to:
   display a content generated from a configuration file defining a plurality of objects using markup tags, in which the plurality of objects are disposed in a first arrangement and are divided into a plurality of display areas, each display area individually selectable to indicate a selection of a corresponding object;
   while displaying the content, receive a plurality of inputs selecting some of the plurality of the display areas;
   in response to receiving the plurality of inputs, edit the configuration file by extracting markup tags defining the selected plurality of objects indicated by the selected display areas from the markup tags defining the plurality of objects within the configuration file and inserting the extracted markup tags defining the selected plurality of objects into a sharing-tag portion of the edited configuration file;
   generate an image in a second arrangement including all of the objects indicated by the selected display areas using the markup tags inserted in the sharing-tag portion of the edited configuration file; and
   transmit, to an external device, information associated with the generated image.

2. The electronic device of claim 1, wherein the instructions, when executed, configure the at least one processor to:
   wherein the second arrangement is different from the first arrangement, such that the designated objects are displayed in a different order in the generated image, and
   wherein when the plurality of inputs selects a first portion of the plurality of objects and omits a second portion of the plurality of objects, all of the first portion are included in the generated image and all of the second portion are omitted from the generated image.

3. The electronic device of claim 1, wherein the configuration file is a hypertext markup language (HTML) file.

4. The electronic device of claim 1, wherein the instructions, when executed, further configure the at least one processor to display a pop-up window for receiving the plurality of inputs.

5. The electronic device of claim 1, wherein the instructions, when executed, configure the at least one processor to generate the image with the designated objects and a background image.

6. The electronic device of claim 1, wherein the instructions, when executed, configure the at least one processor to:
   set a new mark-up language tag in configuration data including mark-up language tags for each of the designated objects,
   render at least one image corresponding to information included in the new mark-up language tag, and
   generate the image with the rendered at least one image.

7. The electronic device of claim 1, wherein the instructions, when executed, further configure the at least one processor to:
   in response to receiving an input to share the image, remove at least portion of the image from the display to display a list of application programs selectable to share the image, after generating the image.

8. The electronic device of claim 7, wherein the instructions, when executed, configure the at least one processor to:
   detect selection of an application program from the list of the application programs for transmitting the image; and
   display the image to an execution screen of the application program.

9. The electronic device of claim 1, wherein the instructions, when executed, further configure the at least one processor to:
   set a new mark-up language tag in configuration data including mark-up language tags for each of the designated objects,
   generate, in a form of a card, another content including at least one image corresponding to information included in the new mark-up language tag.

10. A method for use in an electronic device, the method comprising:
    displaying a content generated from a configuration file defining a plurality of objects using markup tags, in which the plurality of objects are disposed in a first arrangement and are divided into a plurality of display areas, each display area individually selectable to indicate a selection of a corresponding object;
    while displaying the content, receiving a plurality of inputs selecting some of the plurality of the display areas;
    in response to receiving the plurality of inputs, editing the configuration file by extracting markup tags defining the selected plurality of objects indicated by the selected display areas from the markup tags defining the plurality of objects within the configuration file and inserting the extracted markup tags defining the selected plurality of objects into a sharing-tag portion of the edited configuration file;
    generating an image in a second arrangement including all of the objects indicated by the selected display areas using the markup tags inserted in the sharing-tag portion of the edited configuration file; and
    transmitting, to an external device, information associated with the generated image via a communication interface of the electronic device.

11. The method of claim 10, wherein displaying the content comprises:
    wherein the second arrangement is different from the first arrangement, such that the designated objects are displayed in a different order in the generated image, and wherein when the plurality of inputs selects a first portion of the plurality of objects and omits a second portion of the plurality of objects, all of the first portion are included in the generated image and all of the second portion are omitted from the generated image.

12. The method of claim 10, wherein the configuration file is a hypertext markup language (HTML).

13. The method of claim 10, further comprising displaying a pop-up window for receiving the plurality of inputs.

14. The method of claim 10, wherein generating the image comprises generating the image with the designated objects and a background image.

15. The method of claim 10, wherein generating the image comprises:

- setting a new mark-up language tag in configuration data including mark-up language tags for each of the designated objects,
- rendering at least one image corresponding to information included in the new mark-up language tag, and
- generating the image with the rendered at least one image.

16. The method of claim 10, further comprising:

in response to receiving an input to share the image, removing at least portion of the image from the display to display a list of application programs selectable to share the image, after generating the image.

17. The method of claim 16, further comprising:

detecting selection of an application program from the list of the application programs for transmitting the image; and displaying the image to an execution screen of the application program.

18. The method of claim 10, further comprising:

setting a new mark-up language tag in configuration data including mark-up language tags for each of the designated objects, generating, in a form of a card, another content including at least one image corresponding to information included in the new mark-up language tag.

\* \* \* \* \*